(12) United States Patent
O'Farrell et al.

(10) Patent No.: US 11,531,669 B2
(45) Date of Patent: Dec. 20, 2022

(54) SYSTEMS AND METHODS TO ASSESS AND REPAIR DATA USING DATA QUALITY INDICATORS

(71) Applicant: Siemens Industry, Inc., Alpharetta, GA (US)

(72) Inventors: Donal O'Farrell, Vienna (AT); Zhen Song, Austin, TX (US); Megan McHugh, Pflugerville, TX (US); Alexander Guiterrez, Austin, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 309 days.

(21) Appl. No.: 16/999,196

(22) Filed: Aug. 21, 2020

(65) Prior Publication Data

US 2022/0058173 A1 Feb. 24, 2022

(51) Int. Cl.
*G06F 16/23* (2019.01)
*G05B 19/042* (2006.01)

(52) U.S. Cl.
CPC ....... *G06F 16/2365* (2019.01); *G05B 19/042* (2013.01); *G05B 2219/25011* (2013.01)

(58) Field of Classification Search
CPC .............. G06F 16/2365; G05B 19/042; G05B 2219/25011
See application file for complete search history.

(56) References Cited

U.S. PATENT DOCUMENTS

| | | | |
|---|---|---|---|
| 6,681,215 B2 | 1/2004 | Jammu | |
| 9,366,451 B2 | 6/2016 | Guo et al. | |
| 9,753,455 B2 | 9/2017 | Drees | |
| 10,147,040 B2 | 12/2018 | Khurshudov et al. | |
| 11,204,851 B1* | 12/2021 | Iyengar | ............... G06F 11/3072 |
| 2006/0028997 A1* | 2/2006 | McFarland | ............. H04W 4/33 370/252 |

(Continued)

FOREIGN PATENT DOCUMENTS

| | | |
|---|---|---|
| CN | 107806690 A | 3/2018 |
| CN | 110516848 A | 11/2019 |

(Continued)

OTHER PUBLICATIONS

PCT Search Report dated Oct. 28, 2021, for PCT Application No. PCT/US2021/043105,15 pages.

(Continued)

*Primary Examiner* — David E Choi

(57) ABSTRACT

Methods for data quality analysis and aggregation in a building automation system and corresponding systems and computer-readable mediums. A method includes receiving input data and receiving a configuration file that defines data quality (DQ) processes to be performed on the input data. The method includes dynamically building a configurable pipeline based on the configuration file, the pipeline including one or more Data Quality Indicator (DQI) or Data Quality Aggregation (DQA) process components from a DQ core library. The method includes performing DQ processes on the input data, including executing each of the DQI or DQA process components included in the pipeline, producing one or more DQ results based on the DQ processes, and returning the one or more DQ results.

20 Claims, 15 Drawing Sheets

(56) References Cited

U.S. PATENT DOCUMENTS

| | | | |
|---|---|---|---|
| 2006/0063522 A1* | 3/2006 | McFarland | H04Q 9/00 455/423 |
| 2006/0063523 A1* | 3/2006 | McFarland | G08C 17/02 455/423 |
| 2006/0074502 A1* | 4/2006 | McFarland | H04W 40/248 700/47 |
| 2007/0232288 A1* | 10/2007 | McFarland | H04L 41/0803 455/67.11 |
| 2013/0064229 A1* | 3/2013 | Gidlund | H04W 28/065 370/336 |
| 2013/0086010 A1 | 4/2013 | Wenzel et al. | |
| 2013/0094447 A1* | 4/2013 | Gidlund | H04L 69/22 370/328 |
| 2016/0330285 A1* | 11/2016 | Brophy | H04L 69/18 |
| 2017/0169380 A1 | 6/2017 | Maroli et al. | |
| 2018/0211176 A1 | 7/2018 | Khurshudov et al. | |
| 2018/0335772 A1 | 11/2018 | Gorinevsky | |
| 2018/0347843 A1 | 12/2018 | Friedenberger et al. | |
| 2018/0373234 A1 | 12/2018 | Khalate et al. | |
| 2019/0268401 A1 | 8/2019 | Desai et al. | |
| 2019/0312941 A1* | 10/2019 | Maccini | H04H 60/33 |
| 2019/0332294 A1* | 10/2019 | Kilari | G06F 3/0671 |
| 2020/0348662 A1* | 11/2020 | Cella | G06Q 30/02 |
| 2020/0401397 A1* | 12/2020 | Thomas | G06N 5/04 |
| 2021/0000449 A1* | 1/2021 | Deo | A61B 8/5223 |
| 2021/0011698 A1* | 1/2021 | Bond | G06F 8/60 |
| 2021/0109904 A1* | 4/2021 | Kasi | G06F 16/254 |
| 2021/0224245 A1* | 7/2021 | Sharma | G06N 20/00 |
| 2022/0035721 A1* | 2/2022 | Iyengar | G06F 11/3466 |
| 2022/0058173 A1* | 2/2022 | O'Farrell | H04L 43/04 |

FOREIGN PATENT DOCUMENTS

| | | |
|---|---|---|
| EP | 3182284 | 6/2017 |
| WO | 2019243787 | 12/2019 |

OTHER PUBLICATIONS

Steven T. Taylor, "Resetting Setpoints Using Trim & Respond Logic," Ashrae Journal, Nov. 2015, 6 pages.

Fu Xiao, et al., "Bayesian network based FDD strategy for variable air volume terminals", Automation in Construction, Elsevier B.V., 2013, 13 pages.

Yang Zhao, et al., "Diagnostic Bayesian networks for diagnosing air handling units faults—Part II: Faults in coils and sensors", Applied Thermal Engineering, Elsevier Ltd., 2015, 13 pages.

Steven T. Taylor, "Increasing Efficiency With VAV System Static Pressure Static Pressure Setpoint Reset," Ashrae Journal, Jun. 2007, 9 pages.

* cited by examiner

| TIME | METER ID | VALUE | ZERO VALUE | MISSING VALUE | OUTLIER | DQI (BY TIME INDEX) |
|---|---|---|---|---|---|---|
| 1/1/2019 0:15 | 101 | 113 | 0 | 0 | 0.48 | 0.096 |
| 1/1/2019 0:30 | 101 | 32 | 0 | 0 | 0 | 0 |
| 1/1/2019 0:45 | 101 | 0 | 1 | 0 | 0 | 0.4 |
| 1/1/2019 1:00 | 101 | 45 | 0 | 0 | 0 | 0 |
| 1/1/2019 1:15 | 101 | | 0 | 1 | 0 | 0.5 |
| 1/1/2019 1:30 | 101 | 9999 | 0 | 0 | 0.95 | 0.19 |
| 1/1/2019 1:45 | 101 | 432 | 0 | 0 | 0.76 | 0.152 |
| DQ INDEX BY METRIC | | | 1 | 1 | 2.19 | 1.338 |
| WEIGHTS | | | 0.4 | 0.5 | 0.2 | |
| | | | DQ AGGREGATE FOR METER ID 101: | | | 1.338 |

FIG. 13A

| BUILDING | METER ID | METER TYPE | LOCATION | DQ-AGGREGATE | PRIORITY |
|---|---|---|---|---|---|
| NAKATOMI PLAZA | 101 | ELECTRICITY | 30TH FLOOR | 1.338 | 1 |
| WRIGLEY FIELD | 329 | ELECTRICITY | STANDS | 1.1 | 2 |
| SCHONBRUNN PALACE | 232 | WATER FLOW | THEATRE ANNEX 6 | 0.63 | 3 |
| WRIGLEY FIELD | 303 | HEAT PUMP TEMPERATURE | DUGOUT 2 | 0.37 | 4 |
| NAKATOMI PLAZA | 103 | OUTDOOR AIR TEMPERATURE | ROOF | 0.24 | 5 |
| SCHONBRUNN PALACE | 255 | WATER PRESSURE 6 | CAFE | 0.11 | 6 |
| NAKATOMI PLAZA | 106 | CO SENSOR | GARAGE | 0.05 | 7 |
| WRIGLEY FIELD | 376 | HOT WATER TEMP 23 | BASEMENT | 0.04 | 8 |

FIG. 13B

SYSTEMS AND METHODS TO ASSESS AND REPAIR DATA USING DATA QUALITY INDICATORS

CROSS-REFERENCE TO OTHER APPLICATIONS

The present disclosure includes some subject matter in common with, but is otherwise unrelated to, concurrently filed patent application Ser. No. 16/999,225 (entitled "Systems and Methods for Fault Diagnostics in Building Automation Systems") and patent application Ser. No. 16/999,275 (entitled "Systems And Methods For HVAC Equipment Predictive Maintenance Using Machine Learning") which are hereby incorporated by reference.

TECHNICAL FIELD

The present disclosure is directed, in general, to analysis and repair of physical sensor data in building-control systems and other systems.

BACKGROUND OF THE DISCLOSURE

Building automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements that are located in virtually every area of a facility. These building automation systems typically have one or more centralized control stations from which system data may be monitored and various aspects of system operation may be controlled and/or monitored.

To allow for monitoring and control of the dispersed control system elements, building automation systems often employ multi-level communication networks to communicate operational and/or alarm information between operating elements, such as sensors and actuators, and the centralized control station. One example of a building automation system controller is the DXR Controller, available from Siemens Industry, Inc. Building Technologies Division of Buffalo Grove, Ill. ("Siemens"). In this system, several control stations connected via an Ethernet or another type of network may be distributed throughout one or more building locations, each having the ability to monitor and control system operation.

To ensure correct operation of the building automation or control systems, it can be important to ensure that the data generated by the physical sensors and other devices accurately reflects the state of the particular building automation or control system or subsystem (such as a variable air volume subsystem of an HVAC system). Raw data with enough Data Quality (DQ) is the required to proceed with building control processes and related data science algorithms, such as fault detection, machine learning, etc. Due to hardware and software limitations, there are often issues with raw data associated with a particular sensor, device, or subsystem that is captured for a particular building control process, including but not limited to missing data, timestamp misalignment, outlier results, etc. Such issues typically require significant man-hours for a skilled technician, engineer, and/or knowledgeable data scientist to manually filter the raw data to identify and address such issues, resulting in significant costs and time for such efforts. Accordingly, improved systems are desirable.

SUMMARY OF THE DISCLOSURE

This disclosure describes systems and methods to assess and repair data using data quality indicators, with particular application in building automation systems.

According to one embodiment, a method performed by a data processing system includes receiving input data representing the operation of a physical device of a building automation system. The method includes receiving a configuration file that defines data quality (DQ) processes to be performed on the input data. The method includes dynamically building a configurable pipeline based on the configuration file by the data processing system, the pipeline including one or more Data Quality Indicator (DQI) or Data Quality Aggregation (DQA) process components from a DQ core library. The method includes performing DQ processes on the input data by the data processing system, including executing each of the DQI or DQA process components included in the pipeline. The method includes producing one or more DQ results based on the DQ processes. The method includes returning the one or more DQ results by the data processing system. The method can be performed by a data processing system or controller that is part of or in communication with the building automation system.

In various embodiments, the method is performed in a software architecture that includes a pipeline generator that builds the configurable pipeline. In various embodiments, the method is performed in a software architecture that includes a plurality of adapters configured to convert data for use by the one or more DQI or DQA process components. In various embodiments, the DQ processes include generating DQ flags based on domain knowledge, using fixed and fuzzy logic. In various embodiments, the DQ processes include performing an energy meter overflow check. In various embodiments, the DQ processes include performing a summary method process that analyzes DQ data for sensor points based on different time domain aggregation schemes. In various embodiments, the configuration file includes a definition of the configurable pipeline, multiple DQI and DQA process components to be executed in series and/or parallel, and connection between the multiple DQI and DQA process components. In various embodiments, the pipeline includes a DQA process component that uses one of weighted averaging for DQA, a maximum DQI for DQA, time horizon averaging for DQA, or a time horizon maximum for DQA. In various embodiments, the configuration file includes an identification of a schema to be applied, and the schema includes data quality indicators with associated weights, an identification of an aggregation method, and an identification of an interpolation method.

In various embodiments, dynamically building the configurable pipeline includes initializing the configurable pipeline and reading a schema associated with the configuration file. In such embodiments, dynamically building the configurable pipeline includes, based on the schema and the configuration file, selectively adding at least one quality check method to the configurable pipeline, wherein the quality check method is a DQI process component from the DQ core library. In such embodiments, dynamically building the configurable pipeline includes, based on the schema and the configuration file, selectively adding at least one interpolation method to the configurable pipeline. In such embodiments, dynamically building the configurable pipeline includes, based on the schema and the configuration file, selectively adding a flag assignment method to the configurable pipeline. In such embodiments, dynamically building the configurable pipeline includes, based on the schema and the configuration file, selectively adding an aggregation method to the configurable pipeline, wherein the aggregation is a DQA process component from the DQ core library In such embodiments, dynamically building the configurable pipeline includes storing the configurable pipeline.

Disclosed embodiments include a building automation system comprising a plurality of sensors and at least one data processing system configured to process input data collected from the operation of at least one of the plurality of sensors and to perform processes as described herein. Disclosed embodiments include a non-transitory machine readable medium encoded with executable instructions that, when executed, cause at least one processor in a building automation system to perform processes as described herein.

The foregoing has outlined rather broadly some features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 13A and 13B illustrate examples of DQ results in accordance with disclosed embodiments.

DETAILED DESCRIPTION

The figures discussed below and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

A building automation system (BAS) such as disclosed herein can operate in an automatic operation mode that helps operate systems in the space efficiently to save energy. The BAS continuously evaluates environmental conditions and energy usage in the space and can determine and indicate to users when the space is being operated most efficiently. Similarly, the BAS can determine and indicate when the systems operate inefficiently, such as due to an occupant overriding the room control associated with a particular space in a building because of personal preference or due to weather conditions changing drastically. The BAS can automatically, or at the input of a user, adjust the control settings to make the systems operate efficiently again.

For proper operation of the BAS, the BAS collects data from many sensors and other devices that are located, for example, in the rooms of the building, within the ventilation systems, as part of the heating, cooling, or ventilation devices, and otherwise throughout the building and system. Low-quality data, such as missing data points or data points that are not accurate reflections of the building or system conditions, can cause incorrect or inefficient operation. Note that, as used herein, "sensor" is intended to include any physical device that collects data that can be processed as described herein, whether an electric meter, water meter, thermostat, airflow sensor, or other device.

Disclosed embodiments include systems and methods for automated analysis of the quality of the data being processed and correction of the data to ensure proper operation of the BAS.

Figure 1:
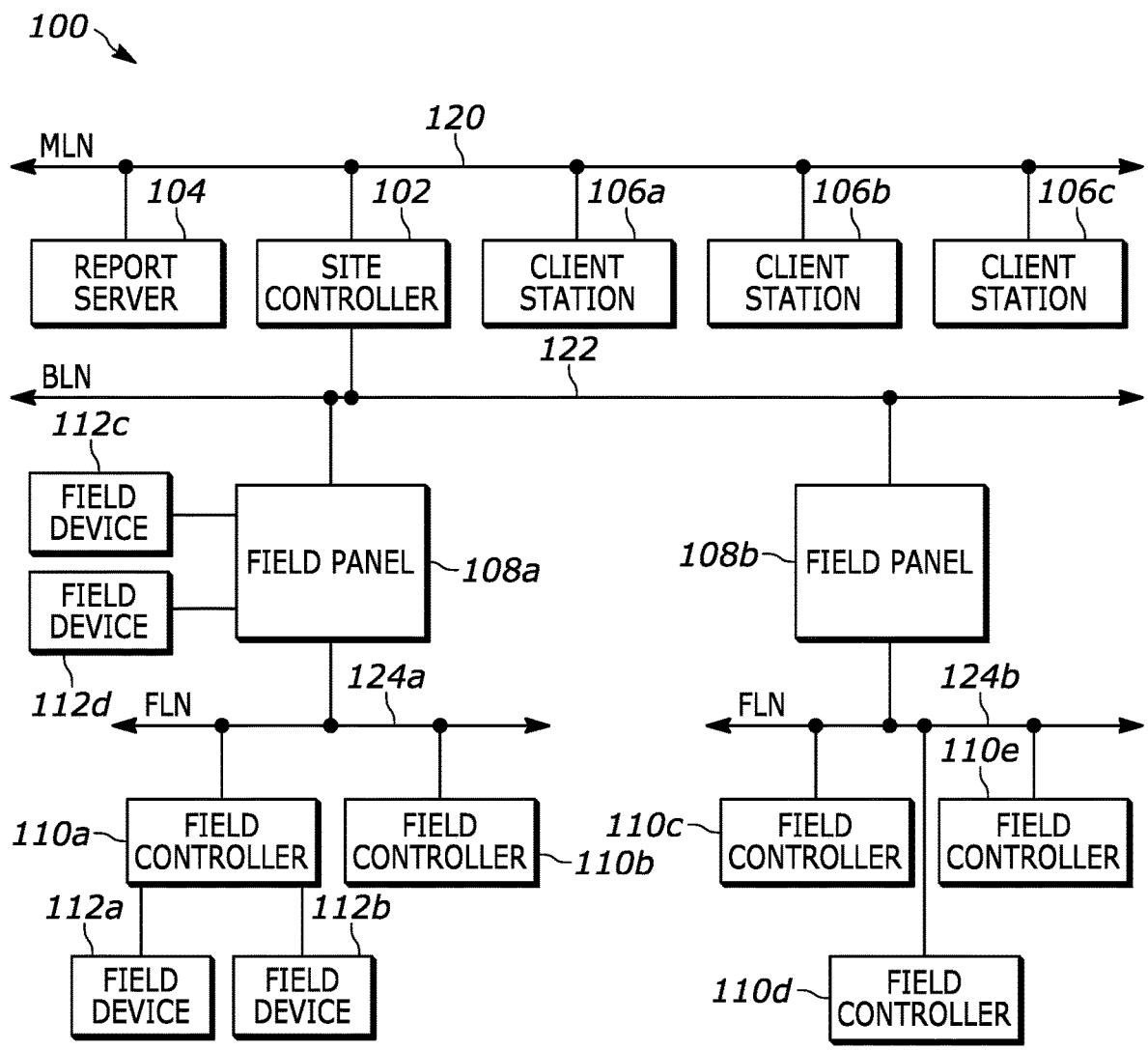
FIG. 1 illustrates a block diagram of a building automation system in which the data quality of a heating, ventilation, and air conditioning (HVAC) system or other systems may be improved in accordance with the present disclosure.

FIG. 1 illustrates a block diagram of a building automation system 100 in which disclosed embodiments can be implemented. The building automation system 100 is an environmental control system configured to control at least one of a plurality of environmental parameters within a building, such as temperature, humidity, lighting and/or the like. For example, for a particular embodiment, the building automation system 100 may comprise the DXR Controller, functioning for example as a field controller or panel controller in the building automation system, that allows the setting and/or changing of various controls of the system. While a brief description of the building automation system 100 is provided below, it will be understood that the building automation system 100 described herein is only one example of a particular form or configuration for a building automation system and that the system 100 may be implemented in any other suitable manner without departing from the scope of this disclosure.

For the illustrated embodiment, the building automation system 100 comprises a site controller 102, a report server 104, a plurality of client stations 106a-c, a plurality of field panels 108a-b, a plurality of field controllers 110a-e and a plurality of field devices 112a-d. Although illustrated with three client stations 106, two field panels 108, five field controllers 110 and four field devices 112, it will be understood that the system 100 may comprise any suitable number of any of these components 106, 108, 110 and 112 based on the particular configuration for a particular building.

The site controller 102, which may comprise a computer or a general-purpose processor, is configured to provide overall control and monitoring of the building automation system 100. The site controller 102 may operate as a data server that is capable of exchanging data with various elements of the system 100. As such, the site controller 102 may allow access to system data by various applications that may be executed on the site controller 102 or other supervisory computers (not shown in FIG. 1).

For example, the site controller 102 may be capable of communicating with other supervisory computers, Internet gateways, or other gateways to other external devices, as well as to additional network managers (which in turn may connect to more subsystems via additional low-level data networks) by way of a management level network (MLN) 120. The site controller 102 may use the MLN 120 to exchange system data with other elements on the MLN 120, such as the report server 104 and one or more client stations 106. The report server 104 may be configured to generate reports regarding various aspects of the system 100. Each client station 106 may be configured to communicate with the system 100 to receive information from and/or provide modifications to the system 100 in any suitable manner. The MLN 120 may comprise an Ethernet or similar wired network and may employ TCP/IP, BACnet, and/or other protocols that support high-speed data communications.

The site controller 102 may also be configured to accept modifications and/or other input from a user. This may be accomplished via a user interface of the site controller 102 or any other user interface that may be configured to communicate with the site controller 102 through any suitable network or connection. The user interface may include a keyboard, touchscreen, mouse, or other interface components. The site controller 102 is configured to, among other things, affect or change operational data of the field panels 108, as well as other components of the system 100. The site controller 102 may use a building level network (BLN) 122 to exchange system data with other elements on the BLN 122, such as the field panels 108.

Each field panel 108 may comprise a general-purpose processor and is configured to use the data and/or instructions from the site controller 102 to provide control of its one or more corresponding field controllers 110. While the site controller 102 is generally used to make modifications to one or more of the various components of the building automation system 100, a field panel 108 may also be able to provide certain modifications to one or more parameters of the system 100. Each field panel 108 may use a field level network (FLN) 124 to exchange system data with other elements on the FLN 124, such as a subset of the field controllers 110 coupled to the field panel 108.

Each field controller 110 may comprise a general-purpose processor and may correspond to one of a plurality of localized, standard building automation subsystems, such as building space temperature control subsystems, lighting control subsystems, or the like. For a particular embodiment, the field controllers 110 may comprise the model DXR controller available from Siemens. However, it will be understood that the field controllers 110 may comprise any other suitable type of controllers without departing from the scope of the present invention.

To carry out control of its corresponding subsystem, each field controller 110 may be coupled to one or more field devices 112. Each field controller 110 is configured to use the data and/or instructions from its corresponding field panel 108 to provide control of its one or more corresponding field devices 112. For some embodiments, some of the field controllers 110 may control their subsystems based on sensed conditions and desired set point conditions. For these embodiments, these field controllers 110 may be configured to control the operation of one or more field devices 112 to attempt to bring the sensed condition to the desired set point condition. It is noted that in the system 100, information from the field devices 112 may be shared between the field controllers 110, the field panels 108, the site controller 102 and/or any other elements on or connected to the system 100.

In order to facilitate the sharing of information between subsystems, groups of subsystems may be organized into an FLN 124. For example, the subsystems corresponding to the field controllers 110a and 110b may be coupled to the field panel 108a to form the FLN 124a. The FLNs 124 may each comprise a low-level data network that may employ any suitable proprietary or open protocol.

Each field device 112 may be configured to measure, monitor and/or control various parameters of the building automation system 100. Examples of field devices 112 include lights, thermostats, temperature sensors, lighting sensors, fans, damper actuators, heaters, chillers, alarms, HVAC devices, window blind controls and sensors, and numerous other types of field devices. The field devices 112 may be capable of receiving control signals from and/or sending signals to the field controllers 110, the field panels 108 and/or the site controller 102 of the building automation system 100. Accordingly, the building automation system 100 is able to control various aspects of building operation by controlling and monitoring the field devices 112. In particular, each or any of the field devices 112 can generate the data that is processed as described herein.

As illustrated in FIG. 1, any of the field panels 108, such as the field panel 108a, may be directly coupled to one or more field devices 112, such as the field devices 112c and 112d. For this type of embodiment, the field panel 108a may be configured to provide direct control of the field devices 112c and 112d instead of control via one of the field controllers 110a or 110b. Therefore, for this embodiment, the functions of a field controller 110 for one or more particular subsystems may be provided by a field panel 108 without the need for a field controller 110.

Figure 2:
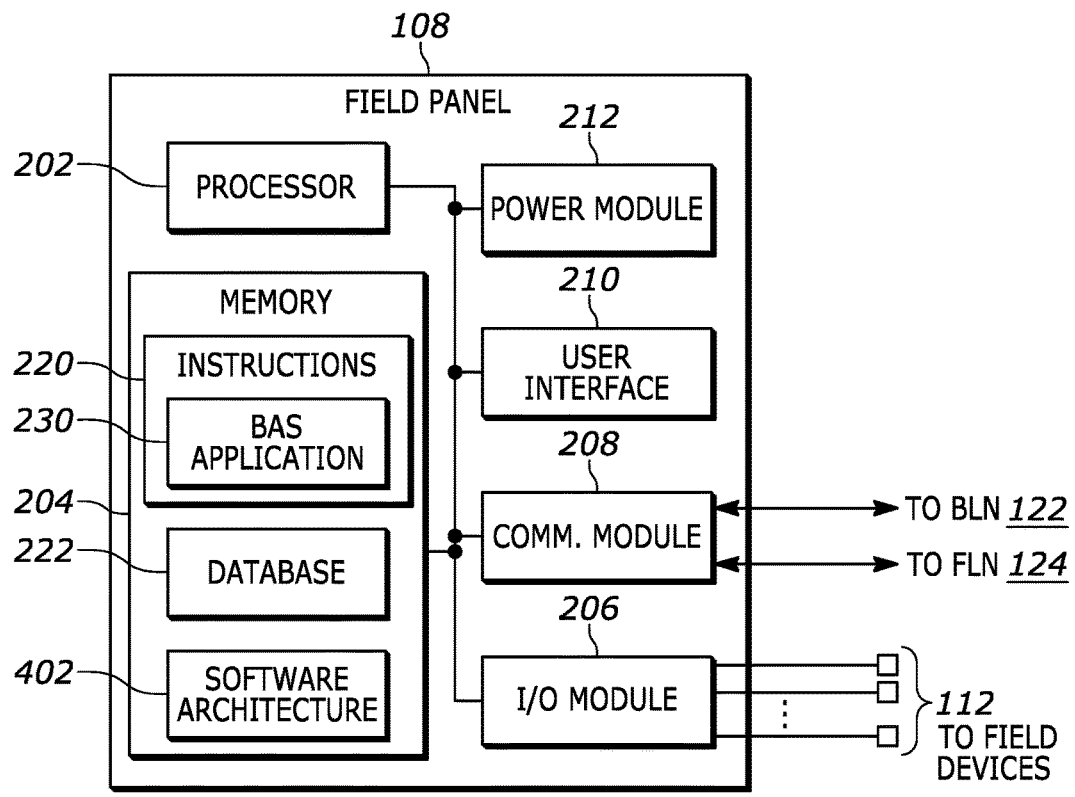
FIG. 2 illustrates details of one of the field panels of FIG. 1 in accordance with the present disclosure.

FIG. 2 illustrates details of one of the field panels 108 in accordance with the present disclosure. For this particular embodiment, the field panel 108 comprises a processor 202, a memory 204, an input/output (I/O) module 206, a communication module 208, a user interface 210 and a power module 212. The memory 204 comprises any suitable data store capable of storing data, such as instructions 220 and a database 222. It will be understood that the field panel 108 may be implemented in any other suitable manner without departing from the scope of this disclosure.

The processor 202 is configured to operate the field panel 108. Thus, the processor 202 may be coupled to the other components 204, 206, 208, 210 and 212 of the field panel 108. The processor 202 may be configured to execute program instructions or programming software or firmware stored in the instructions 220 of the memory 204, such as BAS application software 230. In addition to storing the instructions 220, the memory 204 may also store other data for use by the system 100 in the database 222, such as various records and configuration files, graphical views and/or other information. For example, memory 204 may store a DQ software architecture 402, described in more detail below, that performs data quality processes as described herein.

Execution of the BAS application 230 by the processor 202 may result in control signals being sent to any field devices 112 that may be coupled to the field panel 108 via the I/O module 206 of the field panel 108. Execution of the BAS application 230 may also result in the processor 202 receiving status signals and/or other data signals from field devices 112 coupled to the field panel 108 and storage of associated data in the memory 204, and that data can be processed as described herein. In one embodiment, the BAS application 230 may be provided by or implemented in the DXR Controller commercially available from Siemens Industry, Inc. However, it will be understood that the BAS application 230 may comprise any other suitable BAS control software.

The I/O module 206 may comprise one or more input/output circuits that are configured to communicate directly with field devices 112. Thus, for some embodiments, the I/O module 206 comprises analog input circuitry for receiving analog signals and analog output circuitry for providing analog signals.

The communication module 208 is configured to provide communication with the site controller 102, other field panels 108 and other components on the BLN 122. The communication module 208 is also configured to provide communication to the field controllers 110, as well as other components on the FLN 124 that is associated with the field panel 108. Thus, the communication module 208 may comprise a first port that may be coupled to the BLN 122 and a second port that may be coupled to the FLN 124. Each of the ports may include an RS-485 standard port circuit or other suitable port circuitry.

The field panel 108 may be capable of being accessed locally via the interactive user interface 210. A user may control the collection of data from field devices 112 through the user interface 210. The user interface 210 of the field panel 108 may include devices that display data and receive input data. These devices may be permanently affixed to the field panel 108 or portable and moveable. For some embodiments, the user interface 210 may comprise an LCD-type screen or the like and a keypad. The user interface 210 may be configured to both alter and show information regarding the field panel 108, such as status information and/or other data pertaining to the operation of, function of and/or modifications to the field panel 108.

The power module 212 may be configured to supply power to the components of the field panel 108. The power module 212 may operate on standard 120 volt AC electricity, other AC voltages or DC power supplied by a battery or batteries.

Figure 3:
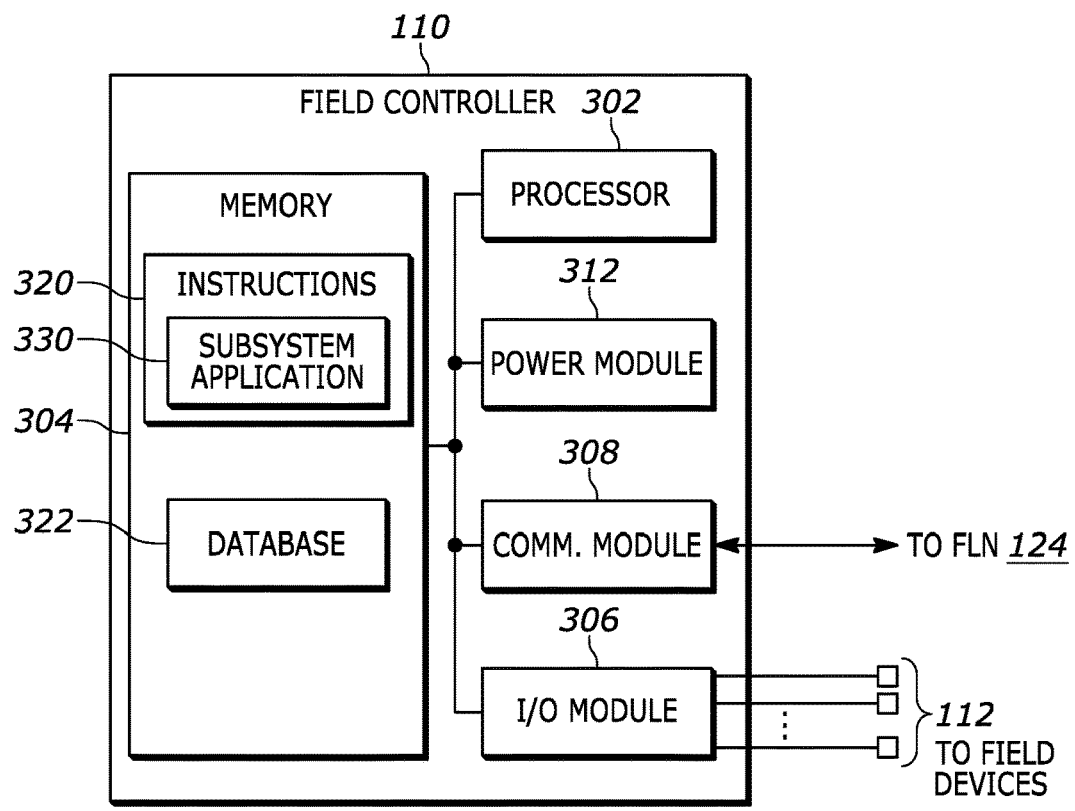
FIG. 3 illustrates details of one of the field controllers of FIG. 1 in accordance with the present disclosure.

FIG. 3 illustrates details of one of the field controllers 110 in accordance with the present disclosure. For this particular embodiment, the field controller 110 comprises a processor 302, a memory 304, an input/output (I/O) module 306, a communication module 308 and a power module 312. For some embodiments, the field controller 110 may also comprise a user interface (not shown in FIG. 3) that is configured to alter and/or show information regarding the field controller 110. The memory 304 comprises any suitable data store capable of storing data, such as instructions 320 and a database 322. It will be understood that the field controller 110 may be implemented in any other suitable manner without departing from the scope of this disclosure. For some embodiments, the field controller 110 may be positioned in, or in close proximity to, a room of the building where temperature or another environmental parameter associated with the subsystem may be controlled with the field controller 110.

The processor 302 is configured to operate the field controller 110. Thus, the processor 302 may be coupled to the other components 304, 306, 308 and 312 of the field controller 110. The processor 302 may be configured to execute program instructions or programming software or firmware stored in the instructions 320 of the memory 304, such as subsystem application software 330. For a particular example, the subsystem application 330 may comprise a temperature control application that is configured to control and process data from all components of a temperature control subsystem, such as a temperature sensor, a damper actuator, fans, and various other field devices. In addition to storing the instructions 320, the memory 304 may also store other data for use by the subsystem in the database 322, such as various configuration files and/or other information. For example, memory 304 may store a DQ software architecture 402, described in more detail below, that performs data quality processes as described herein.

Execution of the subsystem application 330 by the processor 302 may result in control signals being sent to any field devices 112 that may be coupled to the field controller 110 via the I/O module 306 of the field controller 110. Execution of the subsystem application 330 may also result in the processor 302 receiving status signals and/or other data signals from field devices 112 coupled to the field controller 110 and storage of associated data in the memory 304.

The I/O module 306 may comprise one or more input/output circuits that are configured to communicate directly with field devices 112. Thus, for some embodiments, the I/O module 306 comprises analog input circuitry for receiving analog signals and analog output circuitry for providing analog signals.

The communication module 308 is configured to provide communication with the field panel 108 corresponding to the field controller 110 and other components on the FLN 124, such as other field controllers 110. Thus, the communication module 308 may comprise a port that may be coupled to the FLN 124. The port may include an RS-485 standard port circuit or other suitable port circuitry.

The power module 312 may be configured to supply power to the components of the field controller 110. The power module 312 may operate on standard 120 volt AC electricity, other AC voltages, or DC power supplied by a battery or batteries.

Manual inspection of BAS data for data quality (DQ) analysis is not practically possible in many implementations. Theoretically, an engineer could open a data file in plotting software, such as the Excel® spreadsheet program, and plot the curve of the data. A peak or outlier in the curve can a DQ issue and indicate that further actions are required. Finding such an issue among the volume data produced in a BAS system, however, is daunting or impossible. Building clusters are features with large number of sensors: a customer may have several report groups. Each report group includes a large amount of HVAC equipment. Each HVAC equipment contains multiple sensors. In the end, to inspection all the data, an engineer would need to plot curves in the order of $10^4$ to $10^6$ sensor readings, which is not something that can actually be performed manually.

Disclosed embodiments include systems and methods for automated analysis of BAS data to perform data quality inspection, identify flawed or low-quality data points, repair data, aggregate data, identify problematic system devices and processes, and otherwise analysis and process BAS data to enable system analysis and maintenance.

These processes provide significant technological improvements over prior attempts at manual identification of problems and enable data quality analysis that has previously been impossible or impractical.

Disclosed embodiments include systems and methods for performing automatic DQ inspection and data cleansing.

Figure 4:
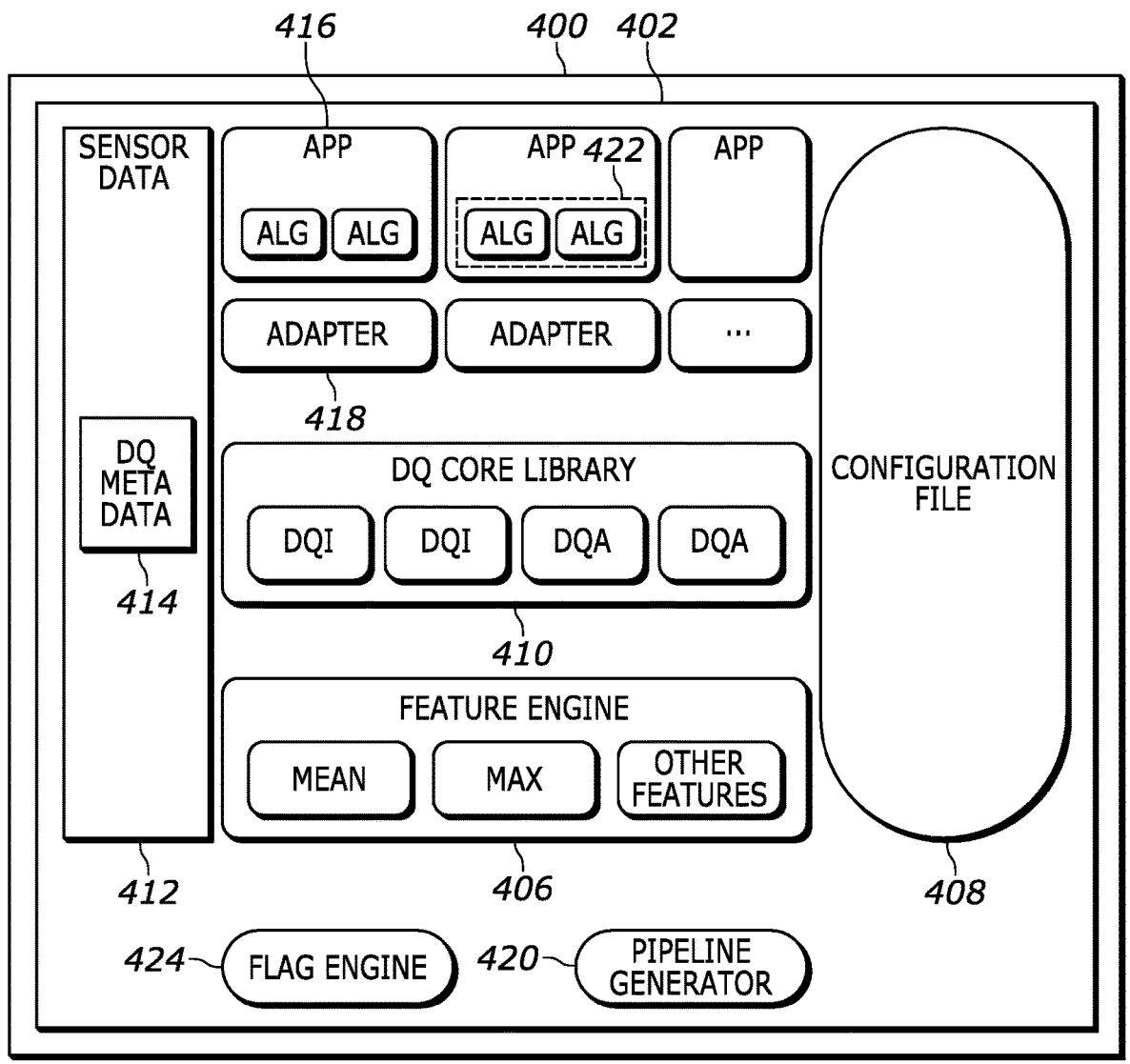
FIG. 4 illustrates an example of elements of a software architecture that can be used to implement disclosed processes.

FIG. 4 illustrates an example of elements of a DQ software architecture 402 that can be used to implement disclosed processes in a data processing system 400. Data processing system 400 can be, for example, an example of one implementation of the site controller data processing system 102, a client station 106, a report server 104, or other client or server data processing system or controller configured to operate as disclosed herein. In various embodiments, the DQ software architecture 402 may be employed in memory 204 of a field panel 108 in communication with the BAS application 230, or in memory 304 of the field controller 110 in communication with the subsystem application 330 for a local implementation of the data quality processing and systems described in detail herein. The DQ software architecture 402 described here is exemplary and non-limiting; specific implementations may use alternate architectural components to perform similar functions, may call various components by different names, may combine or divide the various operations differently with respect to different components, or otherwise use a different logical structure to perform processes as described herein, and the scope of this disclosure is intended to encompass such variations. For example, in some implementations, elements such as the DQ core library 410, the configurable feature engine 406, analysis applications 416, and the configurable pipelines 422 can be implemented together as a DQ core application.

DQ software architecture 402 is an example of an architecture to process Data Quality Indicator (DQI) and Data Quality Aggregation (DQA) data from input data such as sensor or meter data. The DQI as disclosed herein provides a quantification of data quality in uniform and flexible metrics. The DQA as disclosed herein aggregates DQI to enable users to "zoom in" and "zoom out" along time and space horizon to enable the system and user to quickly identify data with quality issues. Where DQI methods, in some cases, produce a DQI value for a given input data (for example, one week of time-series data from a specific energy meter) and/or the results of the quality check methods/algorithms from the feature engine 406, the DQA methods, in some cases, create a DQA value that is constructed of or derived from many calculated DQIs to give an aggregate view of multiple devices, buildings, facilities, or other sets multiple input data. Note that the terms "methods" and "algorithms" may be used to describe specific processes or process components as performed or executed by a data processing system.

DQ software architecture 402 can include a configurable feature engine (FE) 406 to apply or calculate different features defined by a configuration file 408. In various embodiments, the FE contains features (or methods) that execute data quality algorithms or metrics. The FE methods can be added to a configurable pipeline as described herein along with DQI and DQA processes. In various embodiments, the FE features are applied to raw data as may be received or retrieved by the system, such as time series data. The DQI and DQA processes are used to evaluate and aggregate processed data.

With one time-series input, the FE 406 can calculate different statistic features as described in more detail below, including mean, maximum, minimum, and other features. The output of the FE 406 can include scalars or vectors defined in the corresponding "feature" plug-in within the FE 406. For example, the "mean" feature is calculated by a plug-in within the FE 406. In various embodiments, FE 406 provides a set of standard features and can allow third-party features to be integrated or linked. The FE 406 can process and extract data from a single signal/sensor at one time or can process and extract data from multiple signals/sensors concurrently. The feature engine 406 allows not only the DQIs, but also features from 3rd party components. For example, other components can add features as tags on top of sensor data, as described and shown with respect to FIG. 13A below.

FE 406 can also perform basic quality checks such as a zero-value check, an outlier check to identify outlier data points, a boundary check to identify data that exceeds a user defined or internally estimated boundary, i.e., out of range, and an energy meter overflow check. The energy meter overflow check can also be implemented as a flag assignment module or flag engine that can detect energy meter overflow events and add flags to the sensor data as described below. Other discrete quality checks that can be performed by feature engine 406 can include identification of null/missing data points, identification of incomplete or incorrectly formatted data points, identification of data that does not conform to a user defined or calculated time frequency, and identification of energy consumption meter specific data issues such as: negative energy consumption and meter overflow.

DQ software architecture 402 can include a DQ core library 410 that includes configurable Data Quality Indicator (DQI) and Data Quality Aggregation (DQA) calculation components. Each of these components can perform a specific DQI or DQA process on corresponding input data. The use of these configurable components is discussed in more detail below. The DQ core library 410 can include such configurable components as machine learning (ML), artificial intelligence (AI), statistics, and rule-based analytics components, among others.

The DQ core library 410 includes multiple data quality check components that are to be executed as part of a reconfigurable pipeline as described below. Each DQI or DQA check can have a defined function or operation that may process every distinct data point available in the input sensor data 412 and generate, for example, binary (0 or 1) or normalized (between 0 and 1) output values for every such distinct data point available in the input sensor data 412. The checks can include but are not limited to identification of null/missing data points, identification of incomplete or incorrectly formatted data points, identification of data that exceeds a user defined or internally estimated boundary, i.e., out of range, identification of data that does not conform to a user defined or calculated time frequency, identification of outlier data points, and identification of energy consumption meter specific data issues such as: negative energy consumption and meter overflow.

The DQ core library 410 can include a "summary method" process that can be added to a pipeline 422. The summary method can produce the DQ of one or multiple sensor points combined by any order defined in the configuration file 408. The summary method can also analyze DQ data for sensor points based on different time domain aggregation schemes, e.g., daily, weekly, or monthly DQI.

The DQA processes can aggregate DQI information as described in more detail below.

DQ software architecture 402 can receive, load, store, and otherwise process sensor data 412. Sensor data 412 can be "real time" sensor data received in a BAS system as described herein or from another system, can be stored data previously received from such a system, or can be other sensor data such as test data or calibration data. In various embodiments, the sensor data 412 is accessible by any or all of the other elements of the DQ software architecture 402.

Sensor data 412 can include or be associated with DQ metadata 414, such as labels, parameters, or other information defining or describing the sensor data 412. The DQ metadata are tags on the raw sensor data.

DQ software architecture 402 can include one or more analysis applications (apps) 416, each of with can execute one or more analysis algorithms/processes in a configurable pipeline sequence 422 as described herein. Each of the analysis algorithms can be, but are not required to be, a DQI or DQA process from the DQ core library 410 or features of FE 406. The systems of analysis apps can comprise the configurable pipeline sequence 422 and be selected for inclusion in the pipeline based on the configuration file 408.

DQ software architecture 402 can include one or more adapters 418. Adapters 418 can be used to convert or adapt data as necessary between the various calculation components in the DQ core library 410, the apps 416, the sensor data 412 and associated DQ metadata 414, and otherwise as necessary to perform the processes as described herein.

DQ software architecture 402, executing on data processing system 40, can take as input the sensor data 412 and produce one or more DQIs. Each DQI, whether produced by an individual app 416 in configurable pipeline 422 or as the final result of a configurable pipeline 422, can be produced as normalized indicators within [0, 1], where 0 is the best quality and 1 is the worst data quality. In other implementations, the DQI definitions can be reversed (e.g., 1 represents the best quality) or use a different range of values. DQ software architecture 402 and use adjustable weights to aggregate several DQIs into one DQA. Configurable parameters such as a DQI definition, weight values, and a DQA definition can be stored in the configuration file 408. As described herein, DQIs can be aggregated into DQAs. The contents, generation, and use of a configuration file 408 are described in more detail below.

According to disclosed embodiments, pipeline generator 420 of the DQ software architecture 402 can build configurable pipelines 422 in an analysis application 416 to perform DQI and DQA as necessary for specific purposes, such as a combination of data quality detection, aggregation, indexing, and interpolation processes. An exemplary process for generating a configurable pipeline 422 using a configuration file 408 is described in detail below.

For example, the configuration file 408 can include a definition of a processing pipeline of DQI and DQA process components to be executed, such as may be stored in the DQ core library 410. The configurable pipelines can include multiple DQI and DQA process components to be executed in series and/or parallel according to the needs of the users. Users can specify the connections among algorithms and process components and define parallel running or serially-executing processes, and the user specifications can be stored in the configuration file 408. Note that while the exemplary configurable pipeline 422 is illustrated with only two DQ algorithms/processes, a given pipeline 422 generated by pipeline generator 420 may have any number of DQ algorithms/processes, and any of these may be executing in series with or in parallel with other algorithms/processes as may be defined by the pipeline configuration. The configurable pipeline 422 allows analysts to change DQI processing and aggregation without changing the code.

To accommodate multiple configurable algorithms, running in parallel with a diverse possible data sensor data 412 sources, the precise operations taken by the DQ software architecture 402 can be dynamically determined at runtime by pipeline generator 420, and can be affected by the order of data ingress. The configurable pipeline 422 can be generated based on the data context, metadata, and defined client requirements, or other factors, that may be defined in the configuration file 408 or other configuration files or parameters. In this way, the pipeline generator 420 can dynamically generate a pipeline 422 of data quality analysis processes that are potentially unique to the use case of the data being analyzed.

Pipeline generator 420 can combine numerous DQ algorithms/processes for a specific sensor point. For example, for point 1, a pipeline 422 can include a gap checker, frequency checker, etc. For point 2, a pipeline 422 can include an outlier checker, monotonic checker, etc. In contrast to other analysis tools, the pipeline 422 is not hardcoded by data scientists or other developers, and such developers do not know the pipeline configuration during the development phase. The configuration can be defined by application engineers or users and captured in a configuration file 408, after the developers finished their code. Based on a configuration file 408 for a specific implementation, the pipeline generator 420 can build the pipeline(s) 422 at runtime as described in further detail herein.

Configuration file 408 can specify such information as the connections among feature plug-ins, DQI and DQA, DQ feedback components to be executed, and the parameters of each individual component to be executed. The schema of the configuration file 408 is flexible such that it is not necessary to change the source code of DQ components, features, etc., in order to achieve build and execute a desired processing pipeline 422. Configuration file 408 can specify associations between sensor/input data and the applicable DQI, DQA, or other processes. A configuration file 408 can include a default pipeline configuration for a specific type of data or specific source of data, and can be edited as described herein. Further, in processes as described herein, specific operations included in the configuration file can be excluded based on user input during or prior to execution.

Unlike prior approaches that require source code reprogramming to perform DQ analysis functions on different input data, the configuration file 408 as described herein enables application engineers to work independently without adjustment on the DQ core source code for individual applications, such a different buildings, manufacturing systems, or other specific sources of input data.

More broadly, disclosed embodiments enable individuals in distinct roles to collectively define the data analysis processes. The end user of a data quality system as disclosed (or software implementing the processes described herein) is generally the operationally-responsible "owner" of the data being analyzed. These users may be, for example, those individuals responsible for creating reports and analysis using BAS data, but this could be anyone concerned with maintaining the quality and integrity of this data.

An application engineer can refer to the person responsible for setting up such a system to analyze data for a specific building or facility, and can be the individual that specifies, through the configuration file, the scope of the quality checks being completed for that building. The application engineer may also make changes to the configuration where needed, such as at the request of the user or in the event of new capabilities of the system.

The data scientist can be the individual responsible for developing data quality methods that are implemented within the configurable pipeline such as quality checks, aggregation and interpolation. The data scientist can, as needed, update the system with new data quality methods that can be performed as part of the pipeline.

For example, in an exemplary non-limiting use case of disclosed embodiments, an HVAC Application Engineer can create or modify the configuration file 408 using a text editor, graphical editor, or other interface. The Application Engineer can use the configuration file 408 to connect different algorithms, such as programmed and added to the DQ core library 410 by a data scientist. The data scientist is responsible for algorithms development, without knowing the hardware configuration for the specific data source. A DQ core developer can also be responsible for adding features, including DQI, DQA, etc., to the DQ core library 410 or the feature engine 406.

DQ software architecture 402 can include a flag engine 424. Flag engine 424 can be used to generate data quality flags based on domain knowledge, using fixed and fuzzy logic. These flags can then be used as part of the data quality analysis processes in a pipeline 422 to perform DQI and DQA functions. The domain knowledge can be specific to the context in which the disclosed functions are operating, such as in a BAS system, a manufacturing process control system, or other system. Since the definition of a "bad" data point within the scope of data quality analysis is highly dependent on the system being analyzed, the classification of data will be determined by the context data and user input. In disclosed embodiments, all DQI/DQA components and processes use the same flag and value formats, translated as necessary by the adapters, to enable universal DQI processing and aggregation by DQA processes.

Simple Boolean logic (true/false) can be used for the most basic of quality issues, and disclosed embodiments can also use a DQI, described herein, to weigh the feature importance (based on domain knowledge-based configuration) and use fuzzy logic to assign appropriate data quality flags. Fuzzy logic in this case refers to not having sharp boundaries between data quality (I/O) states and assigning a value between 1 and 0. The definition of this non-binary boundary can be achieved with a sigmoid function as described in more detail herein.

Flag engine 424 can be implemented as a plug-in to the pipeline generator 420. The flag engine 424 can modify sensor data, for example by adding "flags" as columns in sensor value tables in a database. The flags can be binary, value, or a string as tags to indicate the DQ of a sensor time series.

The processes and architectures described herein enable collaborative workflows between users, application engineers, and data scientists or other developers. For example, a develop can develop the core features while a data scientists can design the various plug-ins and DQI/DQA components in the library discussed above. The application engineer or other user can then interactively define the configuration file to produce the configurable pipelines. A user can then execute the pipelines for the DQI/DQA results.

As a pipeline 422 is being executed, each or any of the processing components check the associated DQIs or DQAs being generated. If the DQA is less than a threshold, or too many poor DQIs are generated, the components can either refuse to execute (that is, abort the processing pipeline) or can be configured to run another pre-preprocessing function to improve the data quality before continuing the pipeline processing. For example, if the system is required to replace too many missing values, by interpolation or otherwise, the system may determine that the model represented by the input data is not valid and so abort the execution of some or all operations in the configurable pipeline.

The configurable pipeline can also include runtime-defined aggregation and interpolation processes, and components for such processes can also be stored in the DQ core library 410 and referenced by the configuration file 408. Interpolation and aggregation steps can be determined at runtime given needs of user, in particular as may be defined in the configuration file 408.

Interpolation can include but is not limited to basic forward value filling, linear interpolation, and polynomial interpolation.

Aggregation can include summary statistics such as count and mean as well as aggregation of data quality metrics on a daily/weekly/monthly basis and the calculated data quality aggregation. Disclosed embodiments can combine different DQIs with a learning weight method, and can calculate bounds or the derivatives from the raw sensor data input.

Figure 5A:
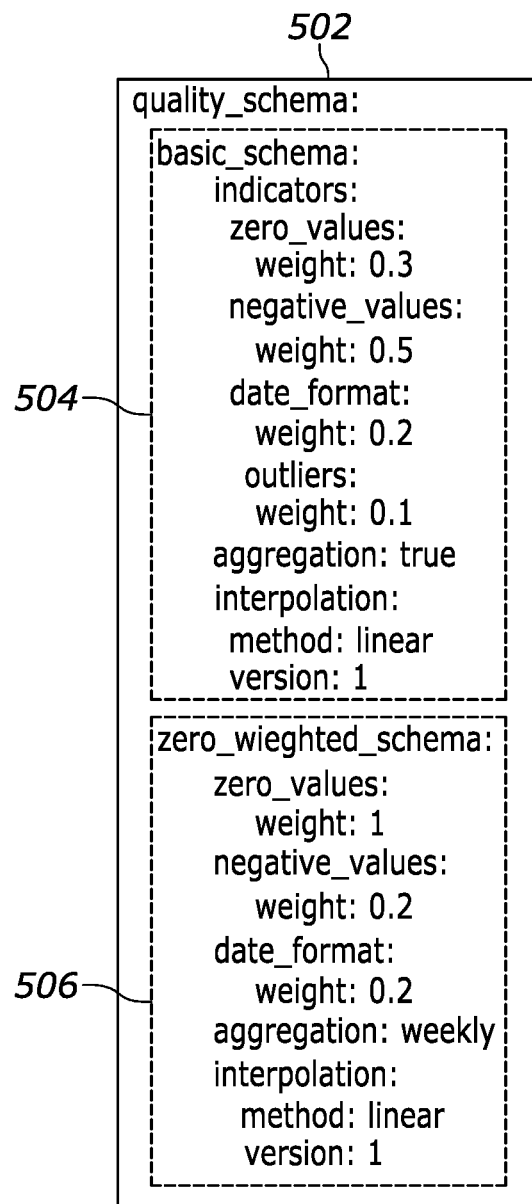
FIG. 5A illustrates a non-limiting example of a schema for use in conjunction with a configuration file in accordance with disclosed embodiments.

FIG. 5A illustrates a non-limiting example of a schema 502 for use in conjunction with a configuration file 514 in accordance with disclosed embodiments. In this example, the "quality schema" 502 defines a basic schema 504 that defines such elements as the weighting to attribute to zero values, negative values, date format, and outliers. Basic schema 504 also defines whether aggregation is to be performed ("true") and the type of interpolation to be used ("linear"). Schema 502 also defines a zero weighted schema 506 that defines such elements as the weighting to attribute to zero values (greater than in the basic schema 504), negative values, and date format. Zero weighted schema 506 also defines how often aggregation is to be performed ("weekly") and the type of interpolation to be used ("linear"). Of course, any other number or different elements can be included in such a schema 502, not limited to this simplified example.

Figure 5B:
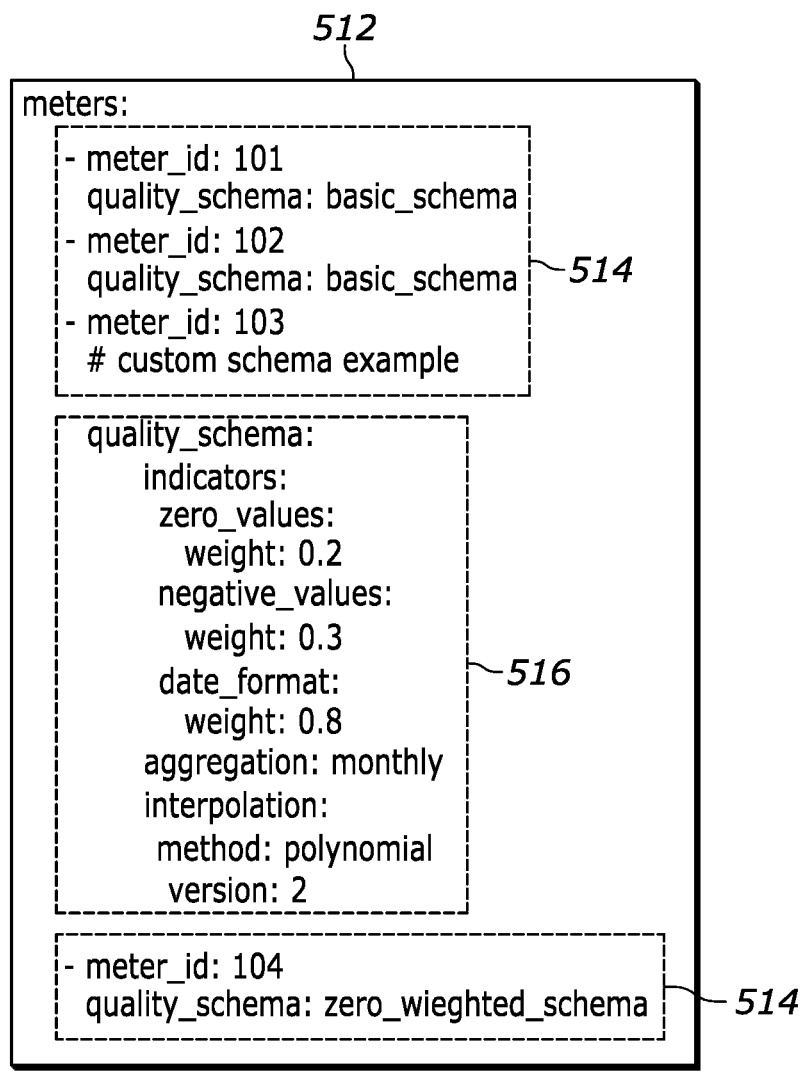
FIG. 5B illustrates a non-limiting example of a configuration file in accordance with disclosed embodiments.

FIG. 5B illustrates a non-limiting example of a configuration file 512 in accordance with disclosed embodiments, shown in YAML Ain't Markup Language (YAML) format, that can be used in conjunction with or combined into schema 502. In various implementations, the configuration file 512 can be implemented in Extensible Markup Language (XML) format, YAML format, JavaScript Object Notation (JSON) format, or another markup language or format. Since configuration file 512 references and can includes schema 502, configuration file 512 and schema 502 together can function as a configuration file 408 described herein.

In this simplified example, configuration file 512 includes a definition of the input data 514, shown as meter IDs 101, 102, 103, and 104, along with the schema to be applied to each source of input data. In this example, the "basic_schema" 504 is used for meter IDs 101 and 102 and the "zero weighted schema" 506 is used for meter ID 104. A custom schema 516 is used for meter ID 103.

As can be seen in the simplified example, of FIGS. 5A and 5B, the configuration file 408 (such as implemented by a configuration file 512 together with a schema 502) defines such elements for the configurable pipeline as input data and sources, data quality indicator processes and the corresponding weightings to be used, data quality aggregation processes to be used, and interpolation processes to be used.

A configuration file 408 can include nodes that may employ specific naming conventions used in a calling application or target application.

Figure 6:
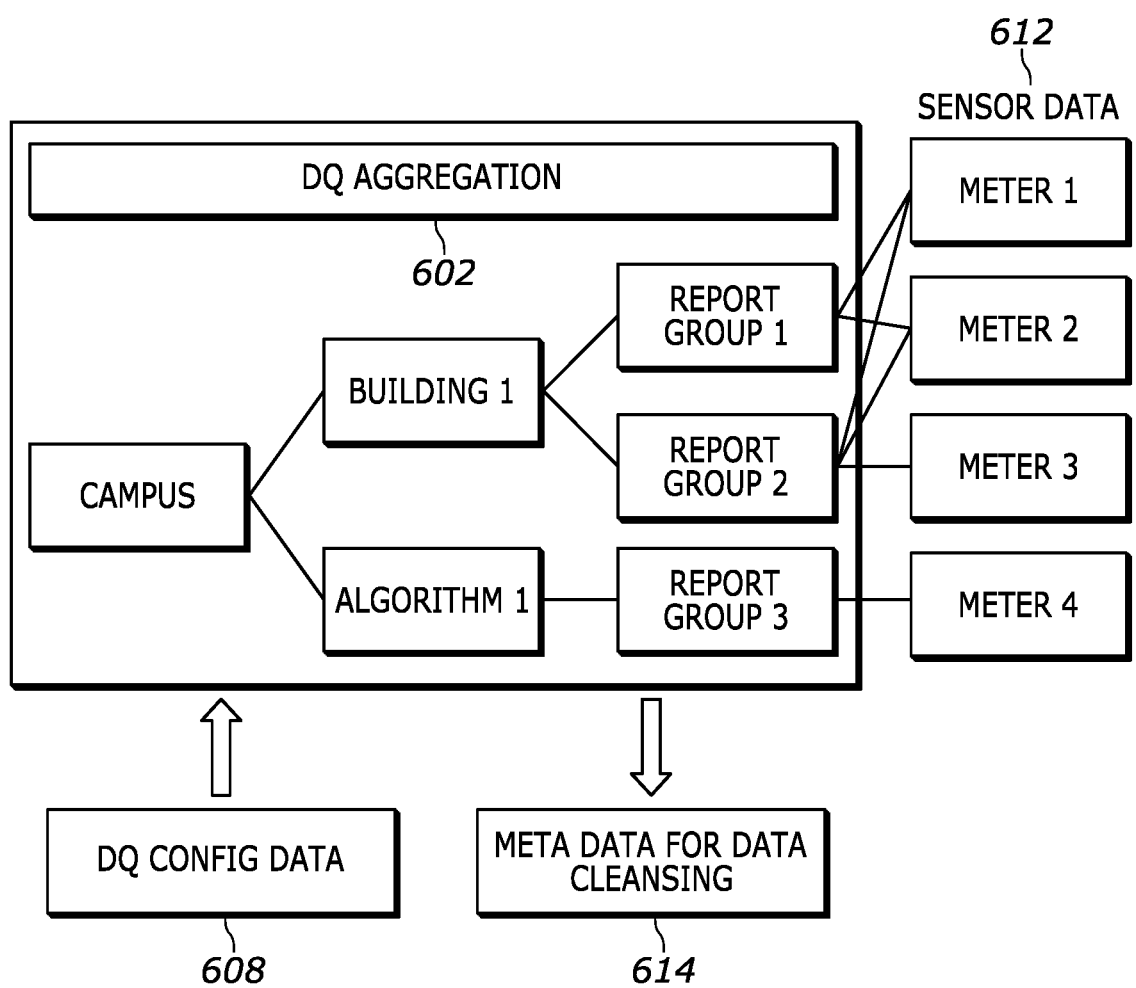
FIG. 6 illustrates an example of a data quality aggregation process in accordance with disclosed embodiments.

FIG. 6 illustrates an example of a data quality aggregation process 602 in accordance with disclosed embodiments. In this example, the DQA process 602 receives sensor data 612 from a plurality of meters. In other cases, the sensor data can come from any of the devices illustrated or described in FIGS. 1-3. DQA process 602 also receives data quality configuration data 608, which can be (but is not necessarily) in the form of a configuration file 408. Details on how configuration files can be used to define specific DQA or DQI processes and appropriate input data are described above.

DQA process 602 can then (as the system is otherwise performing DQ analysis) aggregate any produced DQ data into logical groups, for example according to specifications in objects or according to the DQ configuration data 608. In this example, individual meter/sensor data is first aggregated into report groups. Note that an individual meter can be part of multiple report groups. The DQI/DQA data can be further aggregated, such as by combining multiple report groups into a building group, or by aggregating a report group to be processed by a given algorithm. Still further, all the DQI/DQA data can be further aggregated to reflect the DQ of the entire facility or campus. DQA definitions can be reused as necessary.

In addition to the aggregated DQI/DQA data itself, DQA process 602 can output metadata 614 for use in data cleansing or repair processes. Metadata 614 can be combined with the original sensor data such as in metadata 414. Metadata 614 can include any contextual data needed or useful for certain DQ decisions; for example, metadata 614 can include the min/max boundary of a particular value when this is known and it is desired that this is flagged as an issue.

Disclosed embodiments can also implement novel DQ analysis processes to be stored in the DQ core library 410. Domain-specific DQI calculation methods in particular can use a normalized DQI for each type of data set. For example, in the following out of range DQI definition, a sigmoid function is used to convert a value between [−∞, ∞] to [0, 1].

Disclosed embodiments can process an out-of-range DQI. This out of range DQI is close to 1 when the input values are out of a boundary. When the input sensor value is s and its normal range is s∈[a,b], then the out of range DQI is $m_1$ as defined as:

$$m_1 = f_1(x) = \text{sigmoid}(x_1) + \text{sigmoid}(x_2)$$

$$\text{sigmoid}(x) = \frac{1}{1 + e^{-x}}$$

The original signal/data s is scaled and shifted to produce x values:

$$x_1 = \frac{s - b}{k}$$

$$x_2 = \frac{a - s}{k}$$

where the scalar k is $$k = \frac{a + b}{20}$$

Figure 7:
FIG. 7 illustrates an example of an out-of-range DQI function in accordance with disclosed embodiments.

FIG. 7 illustrates an example of such an out-of-range DQI function, where a=0 and b=2.

Disclosed embodiments can process a gap DQI. The gap DQI is close to 1 if there are more gaps in the sample data. The gap DQI can be calculated as:

$$m_2 = \frac{\sum G_i}{T}$$

where $G_i(s)$ is the i-th gap time for sensor value s, and T is the total time of the measurement.

Disclosed embodiments can process a monotonic DQI. Some meter or sensor data should increase monotonically. To quantify the non-monotonic level of the original sensor data, the system can use an M3 metric, which represents the ratio for the area under raw sensor data over the area of monotonic sensor data.

Figure 8:
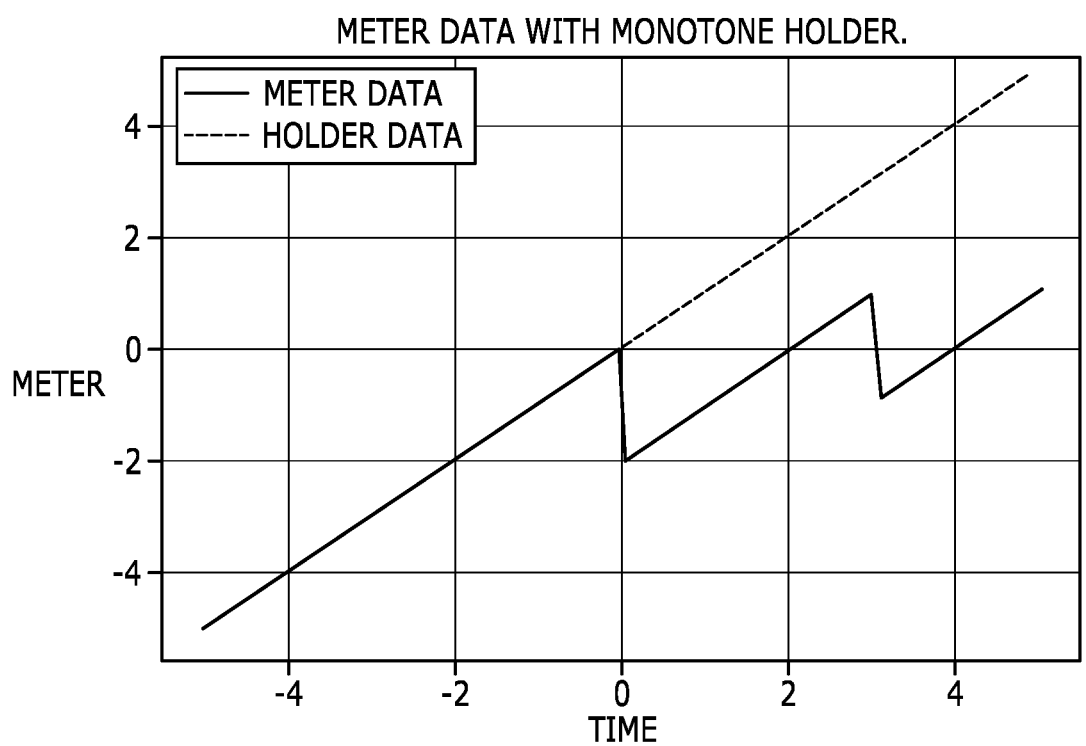
FIG. 8 illustrates an example of monotonic metric calculation using sensor data with a monotone holder in accordance with disclosed embodiments.

FIG. 8 illustrates an example of monotonic metric calculation using sensor data with a monotone "holder," to show a non-limiting example of a detected data quality issue. In this figure, the solid line represents the sensor data, and the dotted/dashed line represents the holder data. Such a monotonic metric calculation can be useful, for example, in the context of an accumulating meter where a failure to increase in a monotonic fashion indicates a data quality problem. The dashed line indicates the expected monotonic increase and the deviation from this is a problem that the DQI is measuring in terms of a normalized severity, when such a DQI process is added to a configurable pipeline as described herein. Such a function can be used to generate DQI values/indices as a value between 0 and 1 that indicate the severity of the data deviation.

The system can use a holder function h(s[i]) and can perform a process in accordance with the following exemplary pseudocode for the monotonic holder function h(s):

```
function h(s)
    shift=0
```

```
for s[i] in each s
    if s[i]-s[-i]<0
        shift = shift + s[i-1]-s[i]
    end if
    y[i] = s[i] + shift
end for
return y[i]
end function
```

Figure 9:
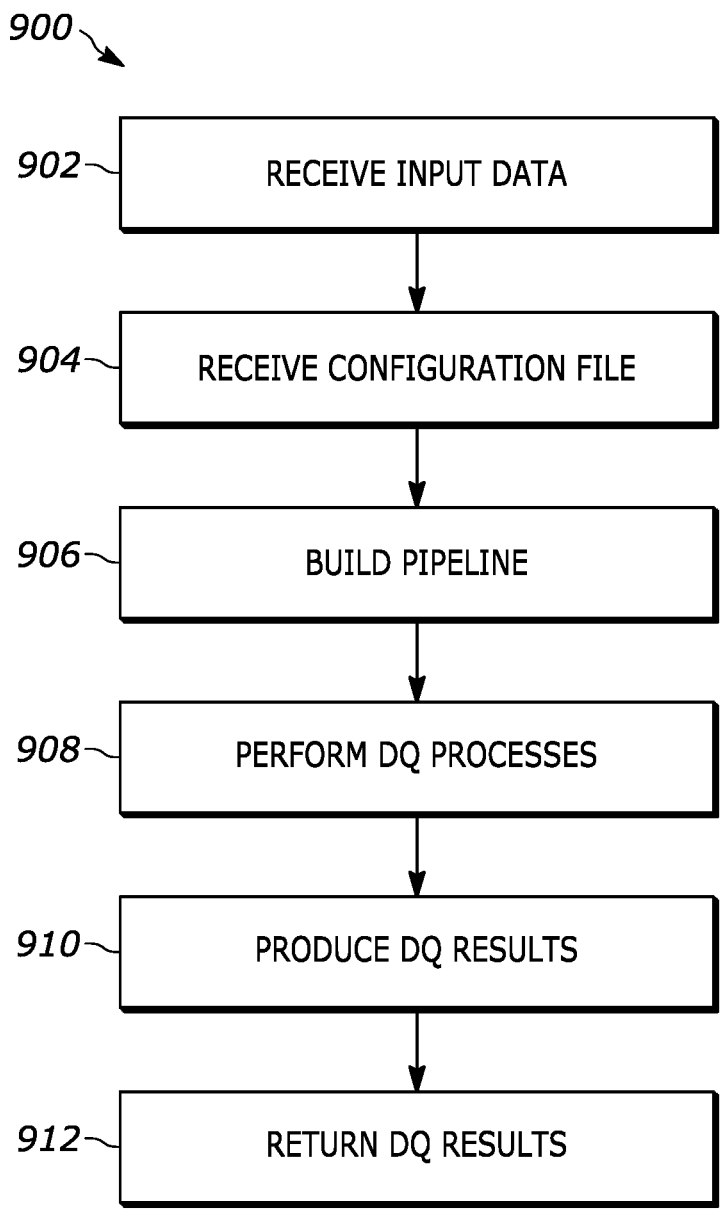
FIGS. 9, 10, 11, and 12 illustrate examples of processes in accordance with disclosed embodiments.

The system can then use an m3 metric, defined as:

$$m_3 = 1 - \frac{\sum(s[i] - s_m)}{\sum\{h(s[i]) - h(s_m)\}}$$

where $s_m$ is the minimal value of sensor reading s. As shown in FIG. 9, h(s[i]) is always increasing. The metric $m_3$ is the area under curve s[i] over the area under the line h(s[i]).

Disclosed embodiments support several processes for data quality aggregation, which aggregate data quality indicators together. Since, in various embodiments, each DQI is a metric between 0 and 1, the system can combine them with different DQA methods.

Disclosed embodiments can use weighted averaging for DQA, for example for calculating DQ for a set of devices in a space horizon. For example, the system can use:

$$m[k] = \sum_i w_i \cdot m_i[k]$$

where $w_i \in [0,1]$ is the weighting factory for the i-th DQI and the time index is k. The aggregation can be used as another DQI for further aggregation.

Disclosed embodiments can use a maximum DQI for DQA. When some DQ issues are very critical, the system can aggregate based on the maximum DQI:

$$m[k]=\max_i(m_i[k])$$

Disclosed embodiments can use time horizon averaging (down sampling) for DQA to help determine if there are any DQ issues in a given time period. The system can also aggregate DQIs based on different time domain samples. A DQA process can take one aggregated sample for every M samples, as:

$$m[Mk]=m[k]\downarrow M$$

For simplicity, define $$m_M[k]=m[Mk]$$

so that $$m_M[k] = \sum_{i=0}^{M-1} w_i \cdot m[Mk - i]$$

where $w_i$ is the weight. Then $m_M[k]$ can be used as another DQI for further aggregation.

Disclosed embodiments can process a time horizon maximum as an alternative or modification to time horizon averaging. The time horizon maximum represents another downsampling method as:

$$m_M[k]=\max_{i=0}^{M-1} m[Mk-i]$$

Using these DQA processes, the system can aggregate DQI metrics layer by layer. From user's perspective, the user can zoom in and zoom out sensor data from either the space or time domain. With DQI and DQA, users can select relevant metric among the large number of sensors as shown in represented by the sensor data of FIG. 4.

The DQIs discussed herein can be calculated, for example, by components in feature engine 406 in FIG. 4, by processes defined in the DQ core library 410, or by other defined processes or components.

FIG. 9 illustrates a process in accordance with disclosed embodiments that can be performed, for example, by a data processing system in a building automation system as described herein, such as by a report server 104, site controller 102, client station 106, or other system or other controller that can connect to data sources within a BAS 100 to generate a corresponding pipeline to enable data quality processing techniques as described in detail herein. In other implementations, such a process can be performed by a separate data processing system or systems using data produced by or received from a BAS. In still other embodiments, such a process can be performed by a data processing system operating on data produced by or received from some other process control system. For simplicity of description, the term "the system" below refers to a data processing system performing a process as described in any of these implementations. A process as in FIG. 9 can include or be combined with any of the other processes, components, or other features described herein.

The system can receive input data to be processed for data quality indicators and/or data quality aggregation (902). "Receiving," as used here, can include loading from storage, receiving from another device or process, receiving via an interaction with a user, or otherwise, and specifically can include receiving device data from one or more sensors or other devices in a building automation system. The input data can include or be associated with DQ metadata that is also received at this time in some implementations; in other cases, DQ metadata is not received at this time but is later created, modified, or appended as described herein. The input data can correspond to data from a single device or from multiple devices.

The system can receive a configuration file that defines DQ processes to be performed on the input data (904). Details and features of various implementations of such a configuration file are described above. The system can be caused to receive the configuration file in any number of ways, including receiving a user input to do so, receiving one or more configuration files in a dedicated electronic mailbox, file folder, or memory storage address, or otherwise. Flexibility in receiving the configuration file to build a configurable pipeline can be useful, for example, as application engineers independently develop configuration files in accordance with a defined schema as described herein and forward such configuration file to the system to prompt a corresponding pipeline to be built "on-demand" for DQ processing of the input data. An exemplary process for generating such a configuration file is described below in the context of FIG. 10.

Note that, in some cases, the nature of the input data received at 902 can determine which configuration file is received at 904. For example, if sensor data from a variable air volume (VAV) unit is received, then the system may load or otherwise receive a configuration file for analyzing a VAV unit. In other cases, the converse can be true, and the configuration file is received at 904 before the input data is received at 902. In these cases, the appropriate input data can be loaded or otherwise received based on what is specified in the configuration file. In either case, the configuration file can define the DQIs or DQAs to associate with the identified input data source and how to process them in a configurable pipeline.

In some embodiments, receiving the input data at 902 and/or receiving the configuration file at 904 can be initiated by or performed under the control of a calling or client application. That is, a calling application may specify the input data and/or configuration file to be used so that processes as disclosed herein are performed, and the results of these processes can then be returned to the calling application.

The system can dynamically build a configurable pipeline based on the configuration file (906). As described herein, this can include building the pipeline from one or more DQI or DQA process components stored in a DQ core library, and the pipeline can include such process components in parallel and/or in series with each other. In various embodiments, the pipeline is dynamically built at runtime, as opposed to being a pre-programmed sequence of operations. An exemplary process for generating such a configurable pipeline is described below in the context of FIG. 11.

The system can perform DQ processes on the input data (908). This can include executing each of the DQI or DQA process components included in the pipeline in the order defined in the pipeline. This can also include performing other DQ processes that are not necessarily part of the pipeline, such as performing DQ processes or checks by a feature engine as described herein. This can also include generating data quality flags based on domain knowledge, such as by a flag engine. This can also include translating data by one or more adapters as necessary for each of the DQ processes.

The DQ processes can include repairing or otherwise processing the data, including performing such functions as normalizing data, performing interpolation to augment the data or replace missing data points, and other processes that are not strictly "data-quality" processes but are nevertheless useful in performing the DQ processes described herein.

Based on the DQ processes, the system can produce one or more DQ results corresponding to the input data (910). The DQ result can include a DQI corresponding to the input data, corresponding to specific data points in the input data, corresponding to the device that produced specific input data, and otherwise. The DQ result can identify low quality or missing data points, including any outliers or other characteristics as described herein. The DQ result(s) can include aggregated data produced from the input data using DQA processes as described herein. The DQ result(s) can include data flags and other indicators of specific and aggregated DQIs as compared to a time series or historical trend.

The system can return the DQ result(s) (912). "Returning" can include storing the DQ result(s) in a storage device, displaying the DQ result(s) to a used in a user interface, transmitting the DQ result(s) to another device or process, or otherwise. In various embodiments, the DQ results can be returned to a calling application for further processing, such as data cleansing, analysis of faults in the physical systems represented by the input data, filtering, visualization, or otherwise.

Producing and returning the DQ results can include parsing the data structure(s) that store the results, such as the augmented sensor data table 1300 and DQ aggregation table 1330 described below. Returning the DQ result(s) can also include storing, displaying, or transmitting an indicator that a low-quality data point may indicate correct data from a device that indicates an abnormal condition reflected by the data point, such as a too-high temperature registered by a thermostat device. In such cases, the "low-quality" data points can indicate failure or misconfiguration of other devices in the system producing the input data, and the DQ results can indicate such a problem. Similarly, the DQ result(s), whether as an individual DQI or from aggregated data, can indicate one or more devices or portions of the system producing the input data that are problem areas.

In some embodiments, the format of the DQ result(s) and/or the input data can be in JSON in a Representational State Transfer (REST) application program interface (API), though the input or output can be implemented using any API or other format as may required by a calling application or a client application.

Figure 10:
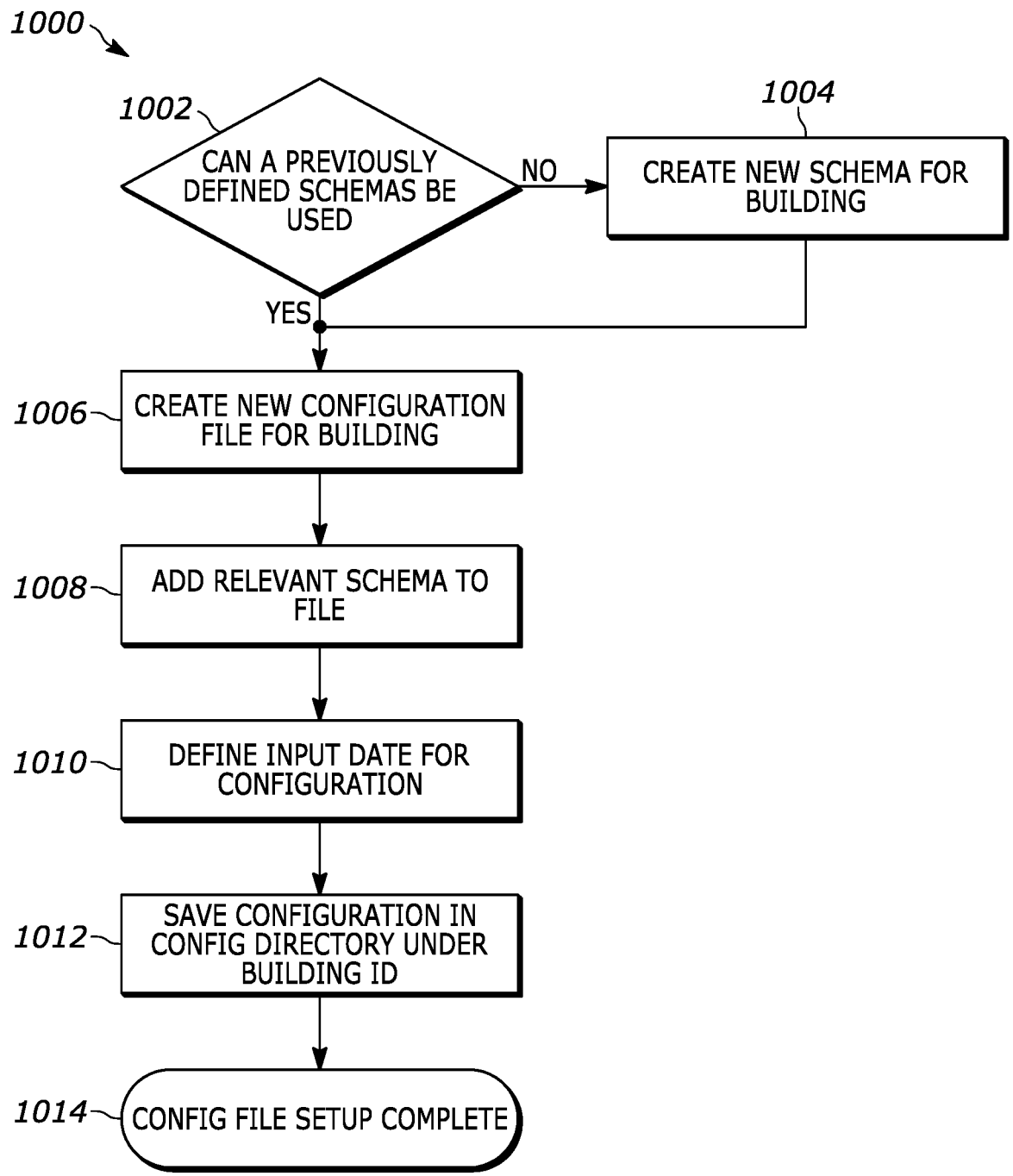

FIG. 10 illustrates a process in accordance with disclosed embodiments that can be performed, for example, by a data processing system in a building automation system as described herein, such as via a user interaction with a report server 104, site controller 102, client station 106, or other system or other controller to generate a configuration file as disclosed herein. In other implementations, such a process can be performed by a separate data processing system or systems using data produced by or received from a BAS. In still other embodiments, such a process can be performed via a user interaction with a data processing system operating on data produced by or received from some other process control system. For simplicity of description, the term "the system" below refers to a data processing system performing a process as described in any of these implementations. A process as in FIG. 10 can include or be combined with any of the other processes, components, or other features described herein.

The system or the user can determine whether one or more existing schemas can be used for the desired processes on a specific building (1002). As part of this process, the system can, for example, identify any schemas that use particular input data, DQA processes, DQI processes, or other factors as disclosed herein. The "building" refers a building automation system and its sensors and other hardware within a physical structure. The data produced by the BAS is to be processed as disclosed herein.

If there is no existing schema that can be used for the desired processes ("NO"), the system can interact with a user to receive or create a new schema for the building (1004). Schema 502, described above, is an example of a schema that can be created.

Once a schema is created at 1004, or if it already exists ("YES") at 1002, the system can interact with a user to receive or create a new configuration file for the building (1006). Configuration file 512, described above, is an example of such a configuration file that can be created.

The system then adds the schema to the configuration file (1008). The combined configuration file and schema, or the configuration file referencing and incorporating the schema, can act as configuration file 408 described above. This configuration file defines the DQI, DUA, and other processes to be performed on input data.

The system can interact with a user to define the input data for the configuration file (1010). In this example, this can be performed by adding the meter IDs of the meters producing the input data to the configuration file.

The system stores the completed configuration (1012). For example, the system can store the configuration file 408 in a configuration directory under a building ID that identifies the building that is being analyzed and is producing the input data.

The configuration file setup is complete (1014).

Figure 11:
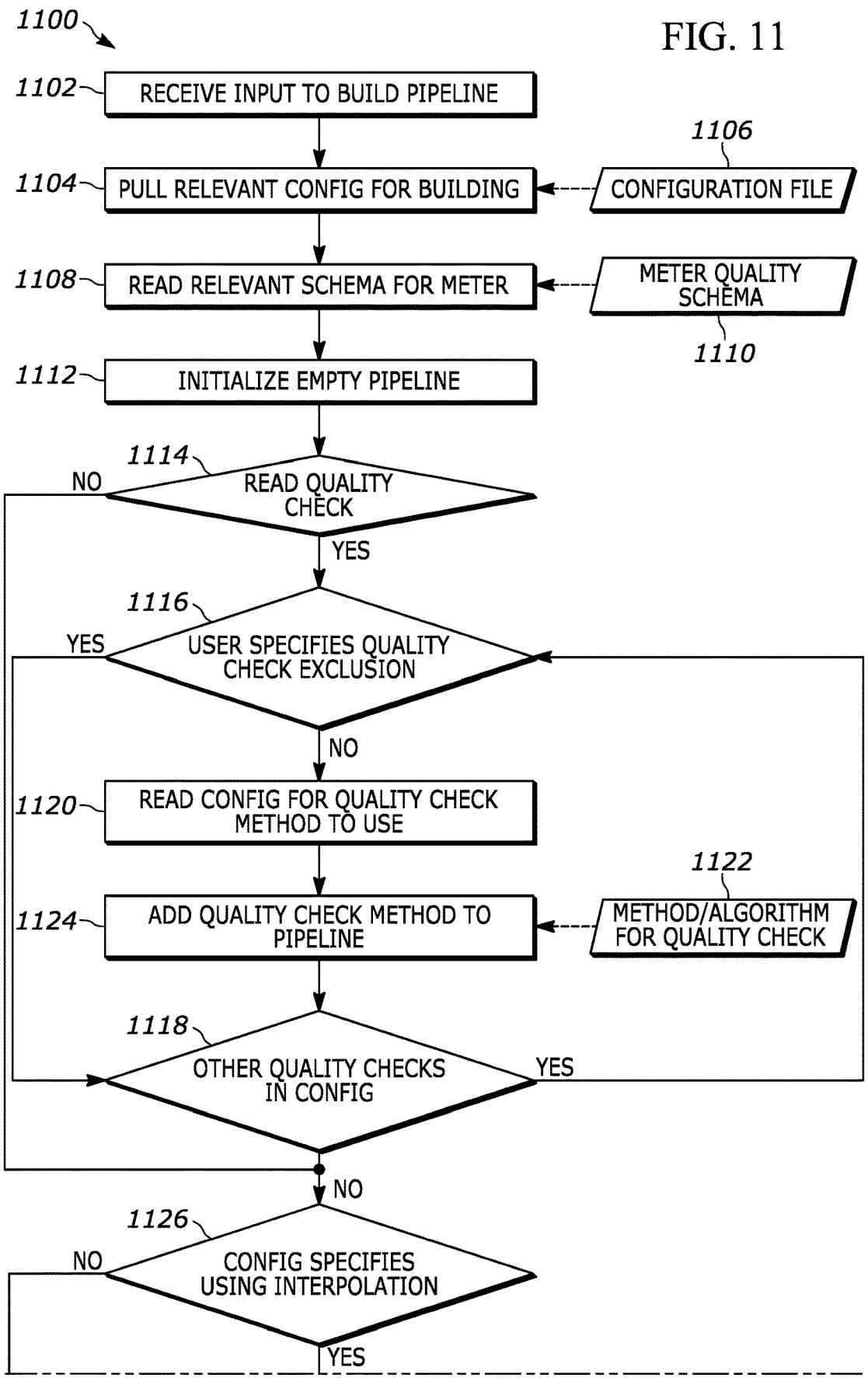
Figure 11:
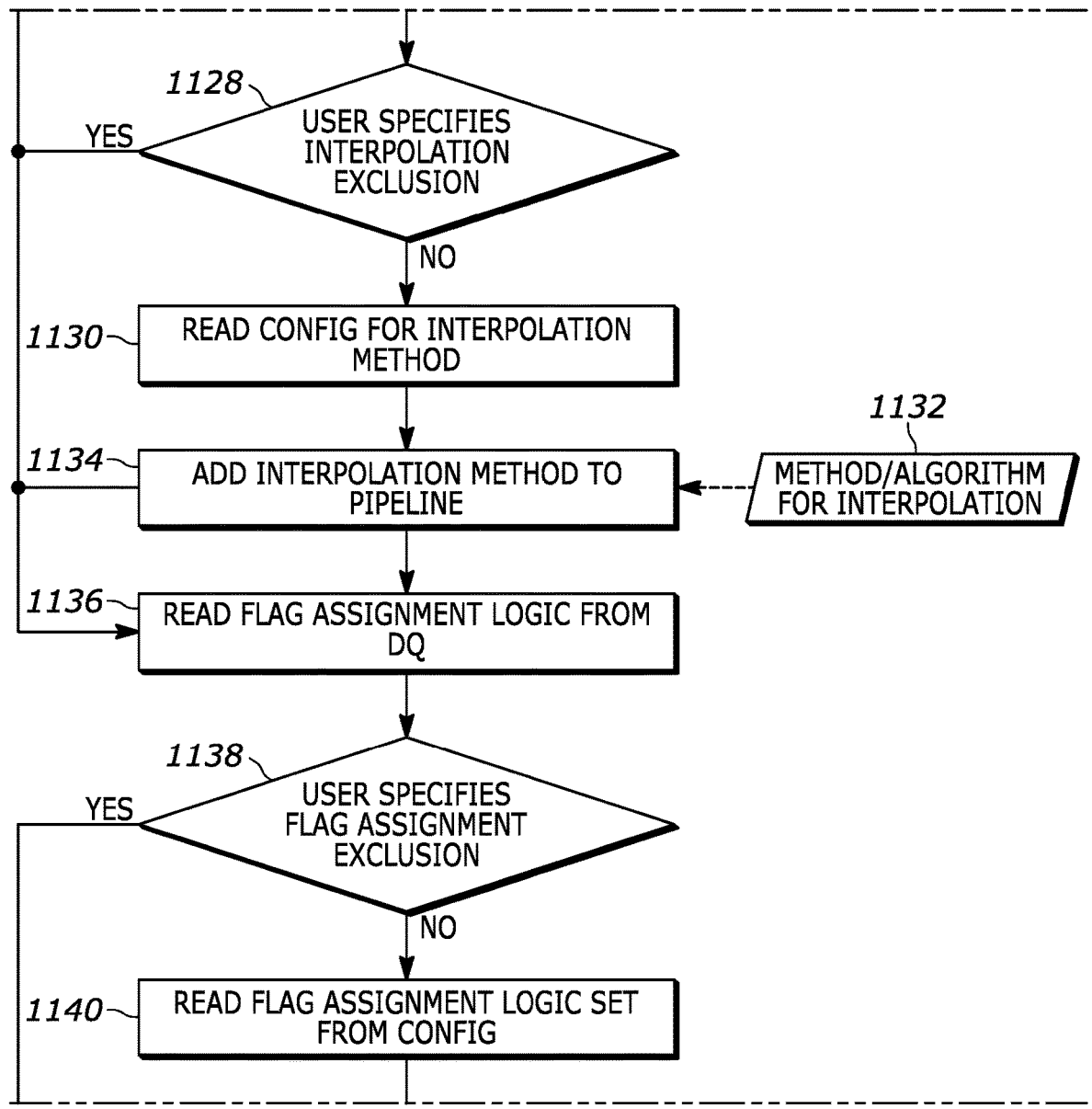
Figure 11:
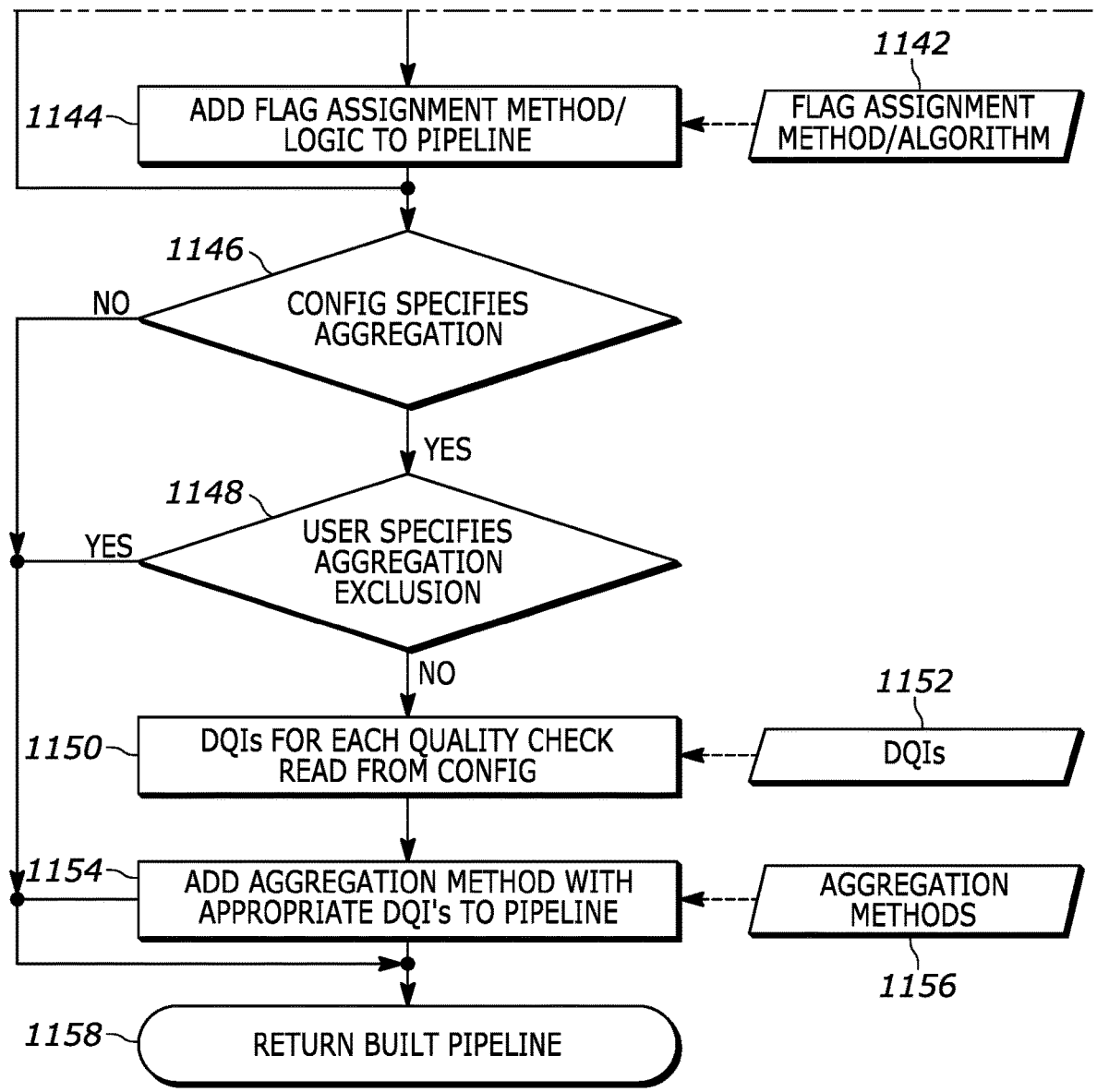

FIG. 11 illustrates a process in accordance with disclosed embodiments that can be performed, for example, by a data processing system in a building automation system as described herein, such as by a report server 104, site controller 102, client station 106, or other system or other controller to generate a configurable pipeline as disclosed herein. In other implementations, such a process can be performed by a separate data processing system or systems using data produced by or received from a BAS. In still other embodiments, such a process can be performed by a data processing system operating on data produced by or received from some other process control system. For simplicity of description, the term "the system" below refers to a data processing system performing a process as described in any of these implementations. A process as in FIG. 11 can include or be combined with any of the other processes, components, or other features described herein.

The system can receive an input indicating that a pipeline should be built (1102). This input can be a user input, an input received from another device, process, or application, or otherwise. The input can indicate the building, meter, device, or other source of the data to be analyzed. For purposes of this example, the input indicates a building corresponding to the configuration file 408 created as in FIG. 10.

The system receives the configuration file for the building (1104), such as configuration file 1106 stored in an external shared location. Configuration file 1106 can be, for example, a configuration file 408. This can include retrieving the configuration file 1106 from a configuration directory that is associated with the building ID for the building. Preferably, and as described above, the configuration files are stored in an external memory location or shared configuration drive, so that the are independently editable and not hard-coded to the DQ core library.

The system reads the relevant quality schema 1110 for the meter(s) defined in the configuration file (1108). As described herein, each configuration file can define the meter or other device to be read, along with the associated schema, such as:

```
meters:
  -  meter_id: 101
     quality_schema: basic_schema
```

The system initializes or instantiates an empty pipeline (1112).

The system reads the relevant quality check(s) to be performed as defined in the configuration file (1114). In the examples of FIGS. 5A and 5B, the quality checks can be read from the quality_schema→basic_schema→indicators.

If there are quality checks to be performed ("YES" at 1114), the system determines, for each quality check, whether the user has specified that a given quality check is to be excluded (1116). If so ("YES"), the system determines if there are other quality checks to be performed (1118), and if so ("YES") returns to 1116 for the next quality check. If not ("NO"), the system moves on to 1126 since all quality checks have been processed or excluded.

If the given quality check was not excluded at 1116 ("NO"), the system reads the quality check method 1122 to be used as defined in the configuration file (1112). In various embodiments, each of these quality checks is part of Feature Engine component 406 of the DQ software architecture 402. In various embodiments, these quality checks can be DQI processes from the DQ core library 410. The quality checks can be a combination of FE processes and DQI processes. A quality check can be a discrete step for data quality issue detection. Each type of check, for example outlier detection, can have multiple algorithms/methods to make that check, as can be specified by the configuration file.

The system adds the given quality check 1122 to the pipeline (1124), such as configurable pipeline 422. The system returns to 1118, above, to determine whether any other quality checks are to be performed.

When all needed and non-excluded quality checks have been added to the pipeline, the system determines whether the configuration file specifies that interpolation should be used on the input data (1126).

If interpolation is to be performed ("YES" at 1124), the system determines whether the user has specified that the interpolation to be excluded (1128). If so ("YES"), the system moves on to 1136 since interpolation will not be performed.

If not ("NO" at 1128), the system reads the interpolation method/algorithm 1132 to be performed as defined in the configuration file (1130). In the examples of FIGS. 5A and 5B, the quality checks can be read from the quality_schema→basic_schema→interpolation→method. The system adds the interpolation method/algorithm 1132 to the pipeline (1134), such as configurable pipeline 422, and moves to 1136.

The system receives flag assignment logic (1136). The flag assignment logic, in some embodiments, this can include default flag assignment logic stored in the DQ core library 410. In some embodiments, the flag assignment logic can be received from a calling or client application. In some embodiments, the flag assignment logic can be specified by specific quality check(s). The flag assignment logic specifies rules such as thresholds, outliers, and other values for flagging specific data.

The system determines whether the user has specified that flag assignments are to be excluded (1138). If so ("YES"), the system moves on to 1146 since flag assignment will not be performed.

If not ("NO" at 1138), the system reads flag assignment logic method/algorithm 1142 to be used from the configuration file (1140). In the examples of FIGS. 5A and 5B, the quality checks can be read from the quality_schema→basic_schema→flagging logic→method. The system adds the flag assignment logic method/algorithm 1142 to the pipeline (1144), such as configurable pipeline 422, and moves to 1146.

The system determines whether the configuration file specifies that data quality aggregation is to be performed (1146). If not ("NO"), the pipeline is complete and the completed pipeline can be returned to the overall process (1158) such as in FIG. 9 at 906.

If data quality aggregation is to be performed ("YES" at 1146), the system determines whether the user has specified that aggregation is to be excluded (1148). If so ("YES"), the pipeline is complete and the completed pipeline can be returned to the overall process (1158) such as in FIG. 9 at 906, since aggregation will not be performed.

If not ("NO" at 1148), the system reads DQIs 1152 and aggregation methods 1156 to be used for data quality aggregation from the configuration file and/or from the quality checks (1150). In various embodiments, each quality check has an associated DQI that is used by aggregation as a weighting mechanism, as shown in the simplified examples of FIGS. 5A and 5B. The DQI values can be used, for example, as part of the index calculation for a given data quality failure type. In the examples of FIGS. 5A and 5B, the aggregation can be read from the quality_schema→aggregation or quality_schema→basic_schema→aggregation.

Figure 12:
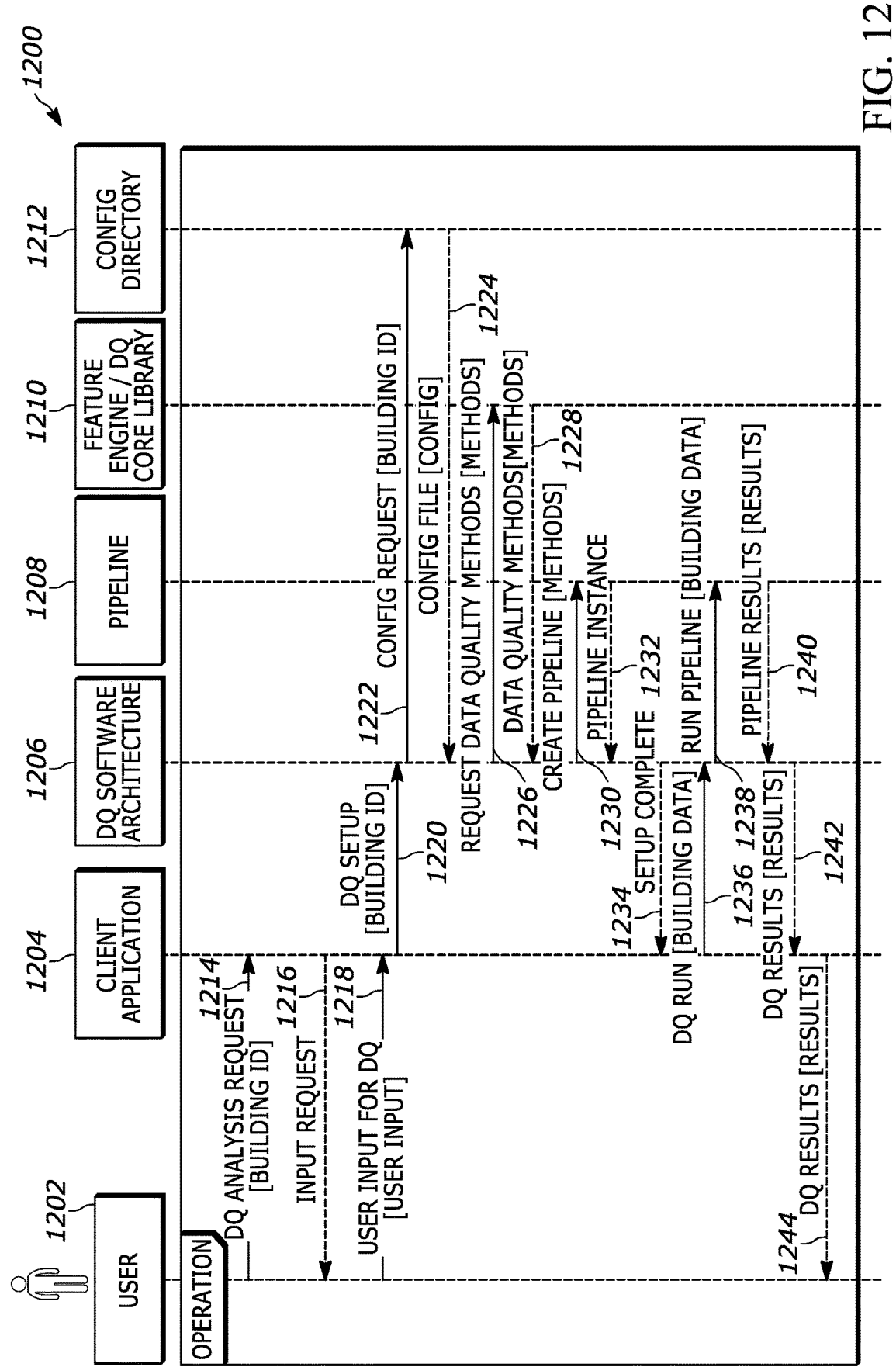

The system adds the aggregation method 1156 with appropriate DQIs 1152 to the pipeline (1154), such as configurable pipeline 422. At this point, the pipeline is complete and the completed pipeline can be returned to the overall process (1158) such as in FIG. 9 at 906, FIG. 12 illustrates an example of a process in accordance with disclosed embodiments that can be performed, for example, by a data processing system in a building automation system as described herein, such as by a report server 104, site controller 102, client station 106, or other system or other controller, illustrating an overall process and interactions in a DQ software architecture 402. In other implementations, such a process can be performed by a separate data processing system or systems using data produced by or received from a BAS. In still other embodiments, such a process can be performed by a data processing system operating on data produced by or received from some other process control system. For simplicity of description, the term "the system" below refers to a data processing system performing a process as described in any of these implementations. The "system" can include client application 1204, DQ software architecture 12206, pipeline 1208, feature engine/DQ core library 1210, and configuration directory 1212, all interacting with one or more users 1202. A process as in FIG. 12 can include or be combined with any of the other processes, components, or other features described herein.

The example of FIG. 12 assumes that some basic configuration has already taken place as described herein. For example, a data scientist or other individual has created DQI and DQI algorithms and the methods that contain them, along with any DQ feature algorithms and the methods that contain them, and stored them as appropriate in a library 1210, such as the FE 406 and DQ core library 410 in the example of FIG. 4. Similarly, an application engineer or other individual has created the relevant configuration files, such as by using a process as described in FIG. 10, and stored them in a configuration directory 1212. Configuration directory 1212 can be implemented in any memory or storage described herein and is preferably externally accessible so that configuration files can be created and edited without recoding of the DQ software architecture 1206 itself.

In this example, the system receives a request to perform a DQ analysis process (1214), such as by a client application 1204 receiving such a request from a user 1202. The system, such as via client application 1204, can request user input (1216), such as the building, device, or facility for which the DQ analysis process is to be performed, or other user input as appropriate. The system, such as via client application 1204, can receive the user input from the user 1202 (1218).

The system can then initiate a DQ analysis setup (1220), such as by the client application 1204 calling the DQ software architecture 1206. The DQ analysis setup initiation can include any relative information, in this example the building ID that identifies the building to be analyzed.

The system can retrieve a configuration file for the DQ analysis (1222, 1224). In this example, the DQ software architecture 1206 sends a request, specifying the building ID, to the configuration directory 1212 (1222). In response, the DQ software architecture 1206 receives the corresponding configuration file from the configuration directory 1212 (1224).

Based on the configuration file, the system retrieves the DQ methods/algorithms (1226, 1228), which can include any DQ checks, FE features, DQI processes, or DQA processes that may be specified in the configuration file as described herein. In this example, the DQ software architecture 1206 sends a request for the DQ methods/algorithms to the FE/DQ core library 1210 (1226), and in response, receives the requested DQ methods/algorithms (1228).

The system creates a pipeline according to the configuration file and using the retrieved DQ methods/algorithms (1230, 1232). This can be performed, for example, according to the process in FIG. 11. In this example, the DQ software architecture 1206 performs a pipeline creation process (1230) to produce an instance of a configured pipeline 1208 (1232).

The system can indicate that the DQ analysis setup is complete (1234). This can be, for example, by the DQ software architecture 1206 notifying the client application 1204 that the DQ analysis setup is complete (1234).

The system can initialize the DQ analysis process (1236). This can be implemented, for example, by the client application 1204 sending the building/sensor data to be analyzed to the DQ software architecture 1206 with instructions to execute the analysis (1236).

The system can perform the DQ analysis process (1238, 1240). In this example, DQ software architecture 1206 can execute the pipeline 1208 using the building/sensor data (1238), receiving the results in response (1240). In executing the pipeline, each of the processes added to the pipeline as described herein are executed to generate DQ results. As described herein, in various cases, the processes added to the pipeline could be performed sequentially, concurrently, or in different order than may be indicated in a configuration file. As described above, the system can abort the pipeline processing under predetermined conditions, such as if the DQA is less than a threshold or too many poor DQIs are generated.

The system can return the DQ results (1242, 1244). In this example, the DQ software architecture 1206 can return the DQ results to the client application 1204 (1242), which in turn can return the DQ results to the user 1202.

FIGS. 13A and 13B illustrate examples of DQ results, such as an augmented sensor data table combining sensor data 412 and DQ metadata 414 and DQ aggregation values, that may be produced by processes as described herein.

FIG. 13A illustrates DQ results as an augmented sensor data table 1300, as an example of calculating a DQ aggregate for the DQ indices. Augmented sensor data table 1300 includes, in this example, the original sensor data such as the time 1302 of each sensor reading, the meter ID 1304, and the actual sensor value 1306 at each time. The "augmented" DQ data includes, in this example and for each sensor reading, a flag for zero values 1308, missing values 1310, and an outlier measurement 1312. The DQ data includes, in this example, a DQI by time index 1318 that reflects the calculated DQI for each time-index sensor reading. The DQ data also includes, in this example, DQI index by metric 1314 which sum the zero values 1308, missing values 1310, and outlier measurements 1312, DQI weights 1316 which are applied to each of the DQI indices by metric 1314.

The DQ data also includes, in this example, a DQ aggregate 1320 for the meter, calculated as the sum of the individual DQI by time index 1318 values. An example of such a calculations as described above using averaging for DQA, for example for calculating DQ for specific device over a set of time index values. For example, the system can use:

$$m[k] = \sum_i w_i \cdot m_i[k]$$

where $w_i \in [0,1]$ is the weighting factory for the i-th DQI and the time index is k. In this example, the column "DQI (by time index)" is equivalent to m[k], $w_i$ values are the DQI weights 1316 and the individual mi[k] values are each DQI index by metric 1314.

Augmented sensor data table 1300 can be a DQ result of a process as described herein, and can be updated continually or repeatedly during pipeline processing so that at any point it reflects a "snapshot" of the data being processed by the pipeline at that point in time.

FIG. 13B illustrates DQ results as a DQ aggregation table 1330. A DQ aggregation table enables a user to immediately see DQ issues across a building, facility, or multiple buildings or facilities, for example. This non-limiting example illustrates DQA results for a plurality of sensors/meters in a plurality of buildings, ranked by priority. The data in this example includes the building 1332, the meter ID 1334 in each building, the meter type 1336 of each meter, the location 1338 of each meter in the building 1332, the DQA value 1340 for each meter, and a priority ranking 1342 for each meter. A BAS as disclosed herein can rank the DQ results, such as shown, by a DQA value, and assign a priority to the ranking, indicating the relative severity of the DQ issues related to the data from each meter, sensor, or other device being evaluated. In this specific example, the DQ aggregation table 1330 ranks the DQ aggregate of individual meters, but similar rankings could be performed for the aggregate DQ values for a collection of meters, such as all of the meters on the floor of a building, all of the meters of a certain type in a given building, all of the meters of a certain type across all buildings in a facility, or otherwise. Note that, in this example, the DQA value 1340 for meter 101 of "Nakatomi Plaza" is the DQ aggregate 1320 as illustrated in FIG. 13A, illustrating that a DQ aggregation table 1330 can reflect the aggregation of multiple augmented sensor data tables 1300. A DQ aggregation table can illustrate the aggregation, rank, and prioritization of DQIs calculated for individual data points on specific meters for any number of buildings and facilities.

Figure 14:
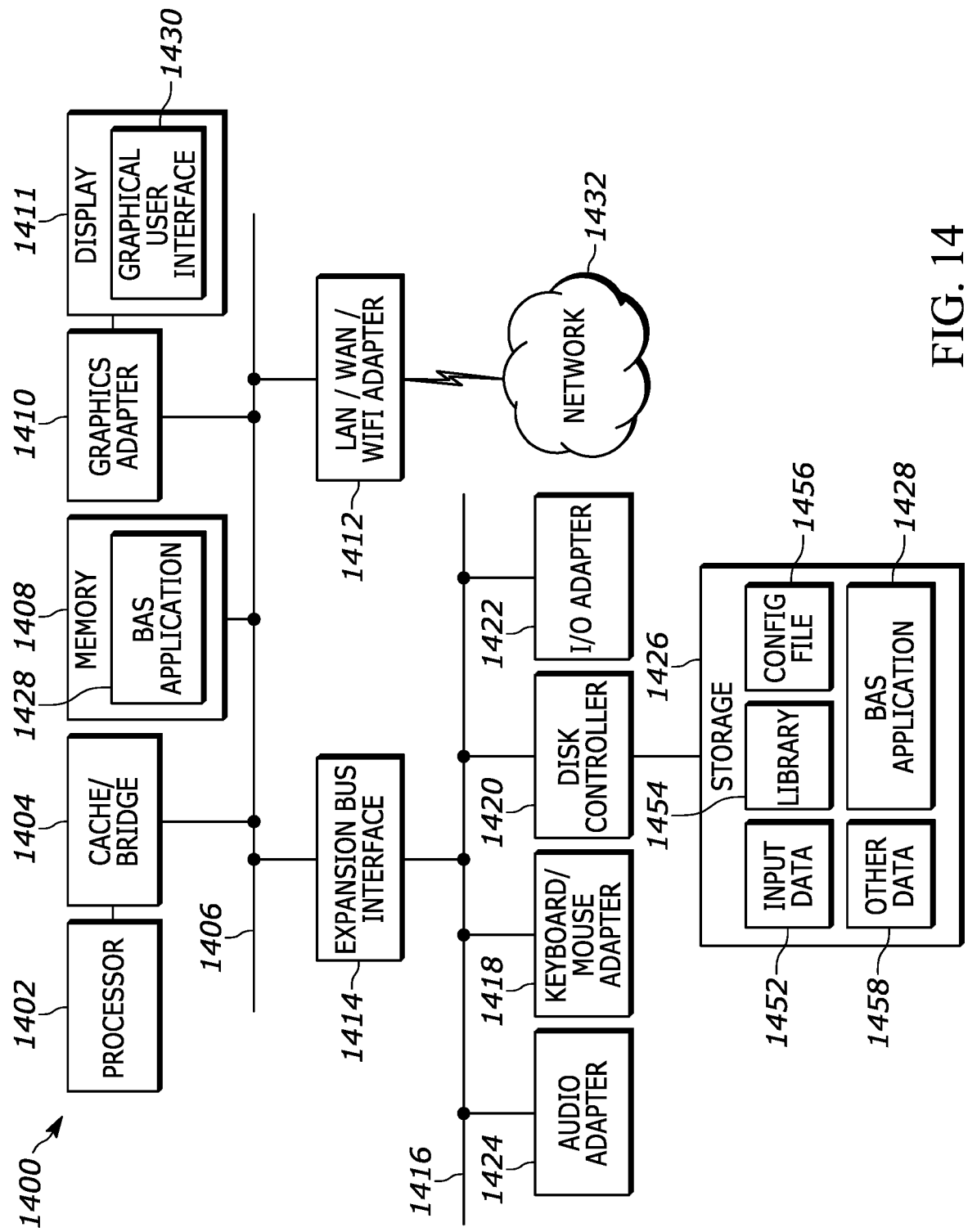
FIG. 14 illustrates a block diagram of a data processing system in which various embodiments can be implemented.

FIG. 14 illustrates a block diagram of a data processing system 1400 in which various embodiments can be implemented. The data processing system 1400 is an example of one implementation of the site controller data processing system 102 in FIG. 1 and of an implementation of a data processing system 400 in FIG. 4.

The data processing system 1400 includes a processor 1402 connected to a level two cache/bridge 1404, which is connected in turn to a local system bus 1406. The local system bus 1406 may be, for example, a peripheral component interconnect (PCI) architecture bus. Also connected to the local system bus 1406 in the depicted example are a main memory 1408 and a graphics adapter 1410. The graphics adapter 1410 may be connected to a display 1411.

Other peripherals, such as a local area network (LAN)/ Wide Area Network (WAN)/Wireless (e.g. WiFi) adapter 1412, may also be connected to the local system bus 1406. An expansion bus interface 1414 connects the local system bus 1406 to an input/output (I/O) bus 1416. The I/O bus 1416 is connected to a keyboard/mouse adapter 1418, a disk controller 1420, and an I/O adapter 1422. The disk controller 1420 may be connected to a storage 1426, which may be any suitable machine-usable or machine-readable storage medium, including, but not limited to, nonvolatile, hard-coded type mediums, such as read only memories (ROMs) or erasable, electrically programmable read only memories (EEPROMs), magnetic tape storage, and user-recordable type mediums, such as floppy disks, hard disk drives, and compact disk read only memories (CD-ROMs) or digital versatile disks (DVDs), and other known optical, electrical, or magnetic storage devices.

Storage 1426 can store any program code or data useful in performing processes as disclosed herein or for performing building automation tasks. In particular embodiments, storage 1426 can include such elements as input data 1452, library 1454, configuration file 1456, and other data 1458, as well as a stored copy of BAS application 1428. Other data 1458 can include the software architecture, any of its elements, or any other data, programs, code, tables, or other information or data discussed above.

Also connected to the I/O bus 1416 in the example shown is an audio adapter 1424, to which speakers (not shown) may be connected for playing sounds. The keyboard/mouse adapter 1418 provides a connection for a pointing device (not shown), such as a mouse, trackball, trackpointer, etc. In some embodiments, the data processing system 1400 may be implemented as a touch screen device, such as, for example, a tablet computer or a touch screen panel. In these embodiments, elements of the keyboard/mouse adapter 1418 may be implemented in connection with the display 1411.

In various embodiments of the present disclosure, the data processing system 1400 can be used to implement as a workstation or as site controller 102 with all or portions of a BAS application 1428 installed in the memory 1408, configured to perform processes as described herein, and can generally function as the BAS described herein. For example, the processor 1402 executes program code of the BAS application 1428 to generate graphical interface 1430 displayed on display 1411. In various embodiments of the present disclosure, the graphical user interface 1430 provides an interface for a user to view information about and control one or more devices, objects, and/or points associated with the management system 100. The graphical user interface 1430 also provides an interface that is customizable to present the information and the controls in an intuitive and user-modifiable manner.

Those of ordinary skill in the art will appreciate that the hardware depicted in FIG. 14 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash., may be employed if suitably modified. The operating system may be modified or created in accordance with the present disclosure as described, for example, to implement discovery of objects and generation of hierarchies for the discovered objects.

The LAN/WAN/WiFi adapter 1412 may be connected to a network 1432, such as, for example, MLN 104 in FIG. 1. As further explained below, the network 1432 may be any public or private data processing system network or combination of networks known to those of skill in the art, including the Internet. Data processing system 1400 may communicate over network 1432 to one or more computers, which are also not part of the data processing system 1400, but may be implemented, for example, as a separate data processing system 1400.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of a system used herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A method in a building automation system, the method performed by a data processing system and comprising:
    receiving, by the data processing system, input data representing operation of a physical device of the building automation system;
    receiving, by the data processing system, a configuration file that defines data quality (DQ) processes to be performed on the input data;
    dynamically building a configurable pipeline based on the configuration file by the data processing system, the configurable pipeline including one or more Data Quality Indicator (DQI) or Data Quality Aggregation (DQA) process components from a DQ core library;
    performing DQ processes on the input data by the data processing system, including executing each of the DQI or DQA process components included in the configurable pipeline;
    producing, by the data processing system, one or more DQ results based on the DQ processes; and
    returning the one or more DQ results by the data processing system.

2. The method of claim 1, wherein the method is performed in a software architecture that includes a pipeline generator that builds the configurable pipeline.

3. The method of claim 1, wherein the method is performed in a software architecture that includes a plurality of adapters configured to convert data for use by the one or more DQI or DQA process components.

4. The method of claim 1, wherein the DQ processes include generating DQ flags based on domain knowledge, using fixed and fuzzy logic.

5. The method of claim 1, wherein the DQ processes include performing an energy meter overflow check.

6. The method of claim 1, wherein the DQ processes include performing a summary method process that analyzes DQ data for sensor points based on different time domain aggregation schemes.

7. The method of claim 1, wherein the configuration file includes a definition of the configurable pipeline, multiple DQI and DQA process components to be executed in series and/or parallel, and connection between the multiple DQI and DQA process components.

8. The method of claim 1, wherein the configurable pipeline includes a DQA process component that uses one of weighted averaging for DQA, a maximum DQI for DQA, time horizon averaging for DQA, or a time horizon maximum for DQA.

9. The method of claim 1, wherein the configuration file includes an identification of a schema to be applied, and the schema includes data quality indicators with associated weights, an identification of an aggregation method, and an identification of an interpolation method.

10. The method of claim 1, wherein dynamically building the configurable pipeline includes:
    initializing the configurable pipeline;
    reading a schema associated with the configuration file;
    based on the schema and the configuration file, selectively adding at least one quality check method to the configurable pipeline, wherein the quality check method is a DQI process component from the DQ core library;
    based on the schema and the configuration file, selectively adding at least one interpolation method to the configurable pipeline;
    based on the schema and the configuration file, selectively adding a flag assignment method to the configurable pipeline;
    based on the schema and the configuration file, selectively adding an aggregation method to the configurable pipeline, wherein the aggregation method is a DQA process component from the DQ core library; and
    storing the configurable pipeline.

11. A building automation system comprising a plurality of sensors and at least one data processing system configured to process input data collected from the operation of at least one of the plurality of sensors, wherein the building automation system is configured to:
    receive input data representing the operation of a physical device of the building automation system;
    receive a configuration file that defines data quality (DQ) processes to be performed on the input data;

dynamically build a configurable pipeline based on the configuration file by the data processing system, the configurable pipeline including one or more Data Quality Indicator (DQI) or Data Quality Aggregation (DQA) process components from a DQ core library;

perform DQ processes on the input data by the data processing system, including executing each of the DQI or DQA process components included in the configurable pipeline;

produce one or more DQ results based on the DQ processes; and return the one or more DQ results.

12. The building automation system of claim 11, wherein the method is performed in a software architecture that includes a pipeline generator that builds the configurable pipeline.

13. The building automation system of claim 11, wherein the method is performed in a software architecture that includes a plurality of adapters configured to convert data for use by the one or more Data Quality Indicator (DQI) or Data Quality Aggregation (DQA) process components.

14. The building automation system of claim 11, wherein the DQ processes include generating DQ flags based on domain knowledge, using fixed and fuzzy logic.

15. The building automation system of claim 11, wherein the DQ processes include performing an energy meter overflow check or performing a summary method process that analyzes DQ data for sensor points based on different time domain aggregation schemes.

16. The building automation system of claim 11, wherein the configuration file includes a definition of the configurable pipeline, multiple DQI and DQA process components to be executed in series and/or parallel, and connection between the multiple DQI and DQA process components.

17. The building automation system of claim 11, wherein the configurable pipeline includes a DQA process component that uses one of weighted averaging for DQA, a maximum DQI for DQA, time horizon averaging for DQA, or a time horizon maximum for DQA.

18. The building automation system of claim 11, wherein the configuration file includes an identification of a schema to be applied, and the schema includes data quality indicators with associated weights, an identification of an aggregation method, and an identification of an interpolation method.

19. The building automation system of claim 11, wherein to dynamically build the configurable pipeline, the data processing system is configured to:

initialize the configurable pipeline;

read a schema associated with the configuration file;

based on the schema and the configuration file, selectively add at least one quality check method to the configurable pipeline, wherein the quality check method is a DQI process component from the DQ core library;

based on the schema and the configuration file, selectively add at least one interpolation method to the configurable pipeline;

based on the schema and the configuration file, selectively add a flag assignment method to the configurable pipeline;

based on the schema and the configuration file, selectively add an aggregation method to the configurable pipeline, wherein the aggregation method is a DQA process component from the DQ core library; and store the configurable pipeline.

20. A non-transitory machine readable medium encoded with executable instructions that, when executed, cause at least one processor in a building automation system to:

receive input data representing the operation of a physical device of the building automation system;

receive a configuration file that defines data quality (DQ) processes to be performed on the input data;

dynamically build a configurable pipeline based on the configuration file by the data processing system, the configurable pipeline including one or more Data Quality Indicator (DQI) or Data Quality Aggregation (DQA) process components from a DQ core library;

perform DQ processes on the input data by the data processing system, including executing each of the DQI or DQA process components included in the configurable pipeline;

produce one or more DQ results based on the DQ processes; and return the one or more DQ results.

* * * * *